United States Patent
Lin et al.

(10) Patent No.: US 11,792,788 B2
(45) Date of Patent: Oct. 17, 2023

(54) RESOURCE BLOCK ASSIGNMENT FOR MSG3 TRANSMISSION

(71) Applicant: Telefonaktiebolaget LM Ericsson (publ), Stockholm (SE)

(72) Inventors: Xingqin Lin, Santa Clara, CA (US); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/689,373

(22) Filed: Mar. 8, 2022

(65) Prior Publication Data
US 2022/0191905 A1    Jun. 16, 2022

Related U.S. Application Data

(63) Continuation of application No. 16/969,414, filed as application No. PCT/EP2019/053800 on Feb. 15, 2019, now Pat. No. 11,284,420.

(Continued)

(51) Int. Cl.
*H04W 72/12*    (2023.01)
*H04W 72/04*    (2023.01)
*H04W 74/08*    (2009.01)
*H04W 72/1268*  (2023.01)
*H04W 74/00*    (2009.01)

(52) U.S. Cl.
CPC ....... *H04W 72/1268* (2013.01); *H04W 72/04* (2013.01); *H04W 74/008* (2013.01); *H04W 74/0833* (2013.01)

(58) Field of Classification Search
None
See application file for complete search history.

(56) References Cited

U.S. PATENT DOCUMENTS 8,780,816 B2 * 7/2014 Montojo ............... H04W 72/04
                                                370/348
9,591,668 B2 * 3/2017 Montojo ............. H04W 74/006
(Continued)

FOREIGN PATENT DOCUMENTS

WO   WO-2017014549 A1 *  1/2017   ........... H04L 1/0036
WO      2017052297 A1      3/2017
WO      2017052445 A1      3/2017

OTHER PUBLICATIONS

International Search Report and Written Opinion dated Jun. 14, 2019 for International Application No. PCT/EP2019/053800 filed on Feb. 15, 2019, consisting of 19-pages.
(Continued)

*Primary Examiner* — Kenny S Lin
(74) *Attorney, Agent, or Firm* — Christopher & Weisberg, P.A.

(57) ABSTRACT

A method, network node and wireless device for determining a fixed size resource block assignment in random access response, RAR, scheduling of MSG3 transmission based on at least one of bandwidth part size, slot/non-slot transmission and resource allocation type, are disclosed. According to one or more embodiments, a network node is configured to communicate with a wireless device. The network node includes processing circuitry configured to determine a fixed size resource block, RB, assignment for random access response, RAR, scheduling of an uplink transmission based at least in part on at least one of: whether the uplink transmission is one of slot and non-slot transmission, resource allocation type, and optionally indicate the fixed sized RB assignment to the wireless device.

20 Claims, 12 Drawing Sheets

Related U.S. Application Data

(60) Provisional application No. 62/710,433, filed on Feb. 16, 2018.

(56) References Cited

U.S. PATENT DOCUMENTS

| | | | |
|---|---|---|---|
| 2010/0040001 | A1 | 2/2010 | Montojo et al. |
| 2016/0100422 | A1 | 4/2016 | Papasakellariou et al. |
| 2017/0055234 | A1 | 2/2017 | Seo et al. |
| 2017/0078830 | A1 | 3/2017 | Wu et al. |
| 2017/0273113 | A1 | 9/2017 | Tirronen et al. |
| 2017/0367120 | A1* | 12/2017 | Murray ............ H04W 74/0833 |
| 2018/0212739 | A1 | 7/2018 | Kim et al. |
| 2019/0075492 | A1 | 3/2019 | Suzuki et al. |

OTHER PUBLICATIONS

International Preliminary Report on Patentability dated May 28, 2020 for International Application No. PCT/EP2019/053800 filed on Feb. 15, 2019, consisting of 12-pages.

3GPP TS 36.213 V14.5.0 3rd Generation Partnership Project; Technical Specification Group Radio Access Network Evolved Universal Terrestrial Radio Access (E-UTRA); Physical layer procedures (Release 14) Dec. 2017, consisting of 462-pages.

3GPP TS 36.213 V15.0.0 3rd Generation Partnership Project; Technical Specification Group Radio Access Network; Evolved universal Terrestrial Radio Access (E-UTRA); Physical layer procedures (Release 15) Dec. 2017, consisting of 493-pages.

3GPP TSG RAN WG1 Meeting AH 1801 R1-1800990; Title: Correction on PRACH procedure; Source: Samsung; Document for: Discussion and Decision; Location and Date: Vancouver, Canada Jan. 22-26, 2018, consisting of 9-jages.

Indian Office Action dated Sep. 9, 2021 for Patent Application No. 202017034031, consisting of 5-pages.

Japanese Decision to Grant with English Machine translation dated Sep. 14, 2021 for Japanese Patent Application No. 2020543371, consisting of 7-pages.

3GPP TSG-RAN WG1 #92 R1-1802905; Title: Remaining issues of the DCI contents and formats; Agenda Item: 7.1.3.1.4; Source: Ericsson; Document for: Discussion and Decision; Date and Location: Feb. 26-Mar. 2, 2018, Athens, Greece, consisting of 11-pages.

* cited by examiner

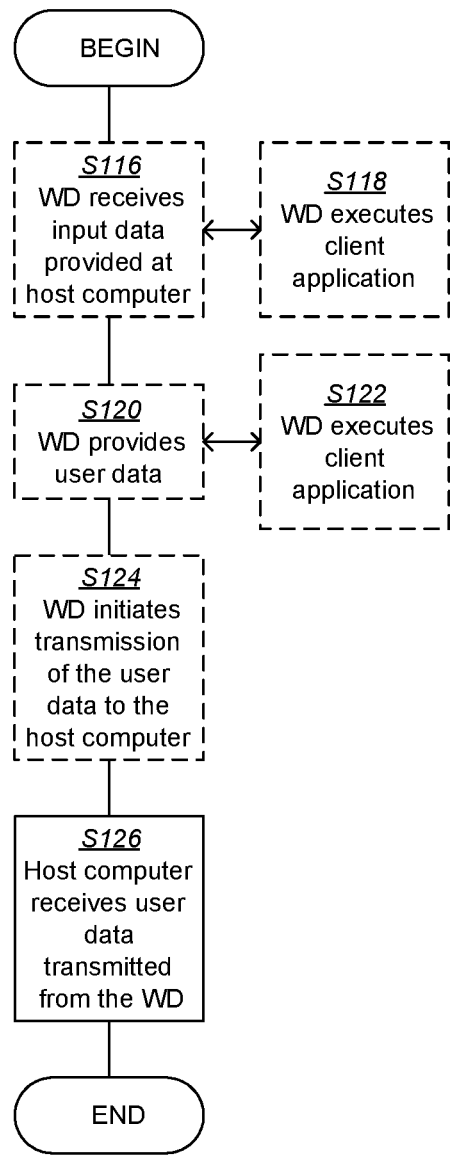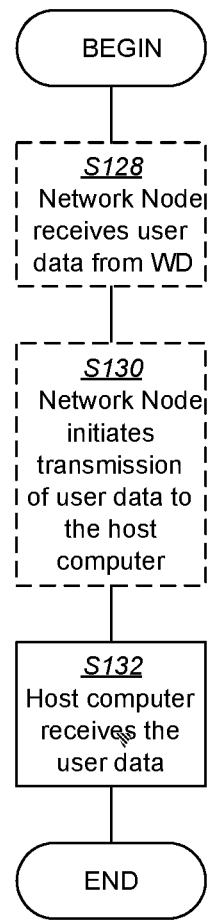
FIG. 9
FIG. 10

RESOURCE BLOCK ASSIGNMENT FOR MSG3 TRANSMISSION

CROSS-REFERENCE TO RELATED APPLICATIONS

This application is continuation of U.S. National Stage patent application Ser. No. 16/969,414, filed on Aug. 12, 2020, entitled RESOURCE BLOCK ASSIGNMENT FOR MSG3 TRANSMISSION, which claims priority to International Application No.: PCT/EP2019/053800, filed Feb. 15, 2019 entitled "RESOURCE BLOCK ASSIGNMENT FOR MSG3 TRANSMISSION," which claims priority to U.S. Provisional Application No. 62/710,433, filed Feb. 16, 2018, entitled "RESOURCE BLOCK ASSIGNMENT FOR MSG3 TRANSMISSION," the entireties of all of which are incorporated herein by reference.

TECHNICAL FIELD

The present disclosure relates to wireless communications, and in particular, for resource block assignment for MSG3 wireless communication transmission.

BACKGROUND

A random access (RA) procedure is a function in a cellular system. In Long Term Evolution (LTE), a wireless device (WD) that would like to access the network initiates the RA procedure by transmitting a preamble (MSG1) in the uplink, i.e., from the WD to the base station, on the Physical Random Access Channel (PRACH). An eNB or gNB (next generation Node B, or transmission/reception point (TRP), i.e. a base station, access node, etc.) receiving the preamble and detecting the random-access attempt will respond in the downlink, i.e., from the base station to the WD, by transmitting a RA response (RAR, MSG2). The RAR carries an uplink scheduling grant for the WD to continue the procedure by transmitting a following subsequent message in the uplink (MSG3) for terminal identification. A similar procedure is envisioned for New Radio (NR) (also known as "5G") as shown in FIG. 1.

Before transmission of the PRACH preamble, the WD receives both a set of synchronization signals and configuration parameters on a broadcast channel in a synchronization signal (SS)-block (i.e., NR-Primary SS (NR-PSS), NR Secondary SS (NR-SSS), NR-physical broadcast channel (NR-PBCH)), possibly complemented with configuration parameters received on yet another channel.

MSG3 is transmitted by using a physical uplink shared channel (PUSCH). Besides MSG3 payload, demodulation reference signals (DMRS) are also transmitted to assist the data decoding at the base station (eNB/gNB). In both LTE and NR, for a 4-step random access procedure, the initial transmission of MSG3 is scheduled by the uplink (UL) grant contained in the random access response (RAR). The retransmission of MSG3 is scheduled by UL grant over the physical downlink control channel (PDCCH). In LTE, MSG3 repetition can be configured by the UL grant contained in RAR for coverage enhancements for bandwidth reduced low complexity (BL)/coverage enhancement (CE) wireless devices.

As part of the RA procedure, after receiving Random Access Request in MSG1, base station provides the required information in MSG2-Random Access Response (RAR) message—for the WD to send the MSG3 (RRC Connection Request). This is referred to as the RAR Grant in the physical layer. In LTE, the RAR Grant is a 20-bit message with contents from most significant bit (MSB) to least significant bit (LSB) as follows:

Hopping Flag—1 Bit
This is 1 bit of information which governs whether frequency hopping is enabled or not. If the value of the bit is 1 and resource block assignment is type 0, the WD should perform physical uplink shared channel (PUSCH) frequency hopping.

Fixed Size Resource Block Assignment—10 Bits
if $N_{RB}^{UL} \leq 44$
Truncate the fixed size resource block assignment to its b least significant bits, where $b=\lceil \log_2(N_{RB}^{UL} \cdot (N_{RB}^{UL}+1)/2) \rceil$, and interpret the truncated resource block assignment according to the rules for a regular downlink control information (DCI) format 0.
else
Insert b most significant bits with value set to '0' after the $N_{UL\_hop}$ hopping bits in the fixed size resource block assignment, where the number of hopping bits $N_{UL\_hop}$ is zero when the hopping flag bit is not set to 1, and is defined in Table 8.4-1 when the hopping flag bit is set to 1, and $b=(\lceil \log_2(N_{RB}^{UL} \cdot (N_{RB}^{UL}+1)/2) \rceil - 10)$ and interpret the expanded resource block assignment according to the rules for a regular DCI format 0.

Truncated Modulation and Coding Scheme—4 Bits
The truncated modulation and coding scheme (MCS) field is interpreted such that the modulation and coding scheme corresponding to the RA Response grant may be determined from MCS indices 0 through 15 in Table 8.6.1-1 from the Third Generation Partnership Project (3GPP) Technical Standard (TS) 36.213.

TPC Command for Scheduled PUSCH—3 Bits
It is indicated in 3 bits as a transmit power control (TPC) command whose value varies from 0 to 7. The TPC command to power mapping may be given by Table 6.2-1 from 3GPP TS 36.213. The TPC command value may range from −6 dB to 8 dB with a 2 dB step size. If a WD is configured with a higher layer parameter pusch-EnhancementsConfig, this field is used to indicate the Repetition number of MSG3.

UL Delay—1 Bit
If a PDCCH with associated RA-radio network temporary identifier (RNTI) is detected in subframe n, and the corresponding downlink shared channel (DL-SCH) transport block contains a response to the transmitted preamble sequence, the WD should, according to the information in the response, transmit an UL-SCH transport block in the first subframe n+k1, k1>=6, if the UL delay field is set to zero where n+k1 is the first available UL subframe for physical uplink shared channel (PUSCH) transmission, where for time division duplex (TDD) serving cell, the first UL subframe for PUSCH transmission is determined based on the UL/DL configuration (i.e., the parameter subframeAssignment) indicated by higher layers. The WD should postpone the PUSCH transmission to the next available UL subframe after if the field is set to 1.

Channel State Information (CSI) Request—1 Bit
This 1 bit of information determines whether an aperiodic channel quality index (CQI), preceding matrix indicator (PMI) and rank indication (RI) report can be included in the PUSCH transmission. For contention based Random access, the CSI field is reserved.

For narrow band Internet of Things (NB-IoT) WDs, the size of an UL grant field may be 15 bits, and for BL WDs and WDs in enhanced coverage level 2 or 3, the size of the UL grant field may be 12 bits. The contents of the UL grant may be those listed in 3GPP Table 6-2 TS 36.213 for BL/CE WD.

In LTE, MSG3 transmission has a fixed transmission duration of one subframe (i.e., 1 ms). In NR, both slot and non-slot based MSG3 transmission are supported. This means that MSG3 transmission can be scheduled with different transmission durations (e.g., 2, 4, 7, or 14 orthogonal frequency division multiplexed (OFDM) symbols). Further, NR supports bandwidth part (BWP) sizes that are much larger than maximum LTE carrier bandwidth. Therefore, the approach currently used in LTE for determining the resource block assignment with fixed size signaling in RAR grant for MSG3 transmission cannot be reused for NR.

With fixed size 20-bit RAR grant and the number of bits used by the above fields, the number of bits left for fixed size resource block assignment is not more than 10. Assuming a ~20-byte MSG3, 6 RBs are needed for MCS=0 and slot based PUSCH transmission with 1+1+1 DMRS configuration. Table 1 shows the maximum number of RBs that can be allocated with NR resource allocation type 1 (equivalently, LTE PUSCH resource allocation type 0) under some example BWP sizes. Clearly, the existing LTE method of fixed size resource block assignment cannot be reused for NR considering (1) BWP size in NR can be much larger than the maximum LTE bandwidth and (2) non-slot based MSG3 transmission (2, 4, 7 symbols) is supported.

TABLE 1

Maximum number of resource blocks (RBs) that can be allocated with NR resource allocation type 1 with start position and length of 1-RB granularity

| # of RBs in a BWP: N_RB | N_RB = 44 | N_RB = 94 | N_RB = 188 | N_RB = 275 |
|---|---|---|---|---|
| 10 bits w/o hopping | 44 RBs | 12 RBs | 6 RBs | 4 RBs |
| 10 bits w/2 bits excluded for hopping | 7 RBs | 3 RBs | 2 RBs | 1 RB |

For NR random access, new fixed size resource block assignment methods are used in RAR grant scheduling MSG3 including scalable resource block (RB) granularity and/or restricted resource block assignment span in a BWP.

SUMMARY

Some embodiments advantageously provide methods, network nodes and wireless devices for resource block assignment for MSG3 transmission.

The fixed size resource block assignment methods described herein can cope with large BWPs in NR and flexible MSG3 transmission that can be slot based or non-slot based (2, 4, or 7 OFDM symbols).

Some embodiments provide for determining a fixed size resource block assignment in random access response, RAR, scheduling of MSG3 transmission based at least in part on at least one of bandwidth part size, slot/non-slot transmission and resource allocation type.

According to one aspect of the disclosure, a network node configured to communicate with a wireless device is provided. The network node includes processing circuitry configured to determine a fixed size resource block, RB, assignment for random access response, RAR, scheduling of an uplink transmission based at least in part on at least one of: whether the uplink transmission is one of slot and non-slot transmission, resource allocation type, and optionally indicate the fixed sized RB assignment to the wireless device.

According to one or more embodiments of this aspect, the fixed size RB assignment indicates a RB granularity where the RB granularity is based at least in part on one of a bandwidth part size and transmission duration. According to one or more embodiments of this aspect, the RB granularity indicates a RB start position and quantity of RBs for the uplink transmission. According to one or more embodiments of this aspect, the uplink transmission corresponds to a message 3, MSG3, transmission. According to one or more embodiments of this aspect, the fixed sized RB assignment is indicated in a message 2, MSG2, transmission.

According to one or more embodiments of this aspect, the fixed sized RB assignment is based at least in part on a bandwidth part size. According to one or more embodiments of this aspect, the uplink transmission is the non-slot transmission having a time duration less than a slot. According to one or more embodiments of this aspect, the fixed size RB assignment corresponds to a subset of RBs in a bandwidth part size if the bandwidth part size is greater than a threshold. According to one or more embodiments of this aspect, the threshold is based at least in part on a transmission duration. According to one or more embodiments of this aspect, the fixed size RB assignment assigns RBs corresponding to one of: lowest RB values of a group of RBs, highest RB values of the group of RBs, and middle RB values of the group of RBs.

According to another aspect of the disclosure, a wireless device configured to communicate with a network node, the wireless device comprising processing circuitry configured to cause transmission of an uplink transmission, the uplink transmission being based at least in part on a fixed size resource block, RB, assignment for RAR scheduling of the uplink transmission, the fixed size RB assignment being based at least in part on at least one of: whether the uplink transmission is one of slot and non-slot transmission and resource allocation type.

According to one or more embodiments of this aspect, the fixed size RB assignment indicates a RB granularity where the RB granularity is based at least in part on one of a bandwidth part size and transmission duration. According to one or more embodiments of this aspect, the RB granularity indicates a RB start position and quantity of RBs for the uplink transmission. According to one or more embodiments of this aspect, the uplink transmission corresponds to a message 3, MSG3, transmission. According to one or more embodiments of this aspect, the fixed sized RB assignment is indicated in a message 2, MSG2, transmission.

According to one or more embodiments of this aspect, the fixed sized RB assignment is based at least in part on a bandwidth part size. According to one or more embodiments of this aspect, the uplink transmission is the non-slot transmission having a time duration less than a slot. According to one or more embodiments of this aspect, the fixed size RB assignment corresponds to a subset of RBs in a bandwidth part size if the bandwidth part size is greater than a threshold. According to one or more embodiments of this aspect, the threshold is based at least in part on a transmission duration. According to one or more embodiments of this aspect, the fixed size RB assignment assigns RBs corresponding to one of: lowest RB values of a group of RBs, highest RB values of the group of RBs, and middle RB values of the group of RBs.

According to another aspect of the disclosure, a method performed by a network node configured to communicate with a wireless device is provided. A fixed size resource block, RB, assignment for random access response, RAR, scheduling of an uplink transmission is determined based at least in part on at least one of: whether the uplink transmission is one of slot and non-slot transmission and resource allocation type. The fixed sized RB assignment is optionally indicated to the wireless device.

According to one or more embodiments of this aspect, the fixed size RB assignment indicates a RB granularity where the RB granularity is based at least in part on one of a bandwidth part size and transmission duration. According to one or more embodiments of this aspect, the RB granularity indicates a RB start position and quantity of RBs for the uplink transmission. According to one or more embodiments of this aspect, the uplink transmission corresponds to a message 3, MSG3, transmission. According to one or more embodiments of this aspect, the fixed sized RB assignment is indicated in a message 2, MSG2, transmission. According to one or more embodiments of this aspect, the fixed sized RB assignment is based at least in part on a bandwidth part size.

According to one or more embodiments of this aspect, the uplink transmission is the non-slot transmission having a time duration less than a slot. According to one or more embodiments of this aspect, the fixed size RB assignment corresponds to a subset of RBs in a bandwidth part size if the bandwidth part size is greater than a threshold. According to one or more embodiments of this aspect, the threshold is based at least in part on a transmission duration. According to one or more embodiments of this aspect, the fixed size RB assignment assigns RBs corresponding to one of: lowest RB values of a group of RBs, highest RB values of the group of RBs, and middle RB values of the group of RBs.

According to another aspect of the disclosure, a method performed by a wireless device configured to communicate with a network node is provided. Transmission of an uplink transmission is caused where the uplink transmission is based at least in part on a fixed size resource block, RB, assignment for RAR scheduling of the uplink transmission. The fixed size RB assignment is based at least in part on at least one of: whether the uplink transmission is one of slot and non-slot transmission, and resource allocation type.

According to one or more embodiments of this aspect, the fixed size RB assignment indicates a RB granularity where the RB granularity is based at least in part on one of a bandwidth part size and transmission duration. According to one or more embodiments of this aspect, the RB granularity indicates a RB start position and quantity of RBs for the uplink transmission. According to one or more embodiments of this aspect, the uplink transmission corresponds to a message 3, MSG3, transmission. According to one or more embodiments of this aspect, the fixed sized RB assignment is indicated in a message 2, MSG2, transmission. According to one or more embodiments of this aspect, the fixed sized RB assignment is based at least in part on a bandwidth part size.

According to one or more embodiments of this aspect, the uplink transmission is the non-slot transmission has a time duration less than a slot. According to one or more embodiments of this aspect, the fixed size RB assignment corresponds to a subset of RBs in a bandwidth part size if the bandwidth part size is greater than a threshold. According to one or more embodiments of this aspect, the threshold is based at least in part on a transmission duration. According to one or more embodiments of this aspect, the fixed size RB assignment assigns RBs corresponding to one of lowest RB values of a group of RBs, highest RB values of the group of RBs, middle RB values of the group of RBs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart illustrating exemplary methods implemented in a communication system including a host computer, a network node and a wireless device for receiving user data from the wireless device at a host computer according to some embodiments of the present disclosure;

FIG. 10 is a flowchart illustrating exemplary methods implemented in a communication system including a host computer, a network node and a wireless device for receiving user data at a host computer according to some embodiments of the present disclosure;

DETAILED DESCRIPTION

Figure 1:
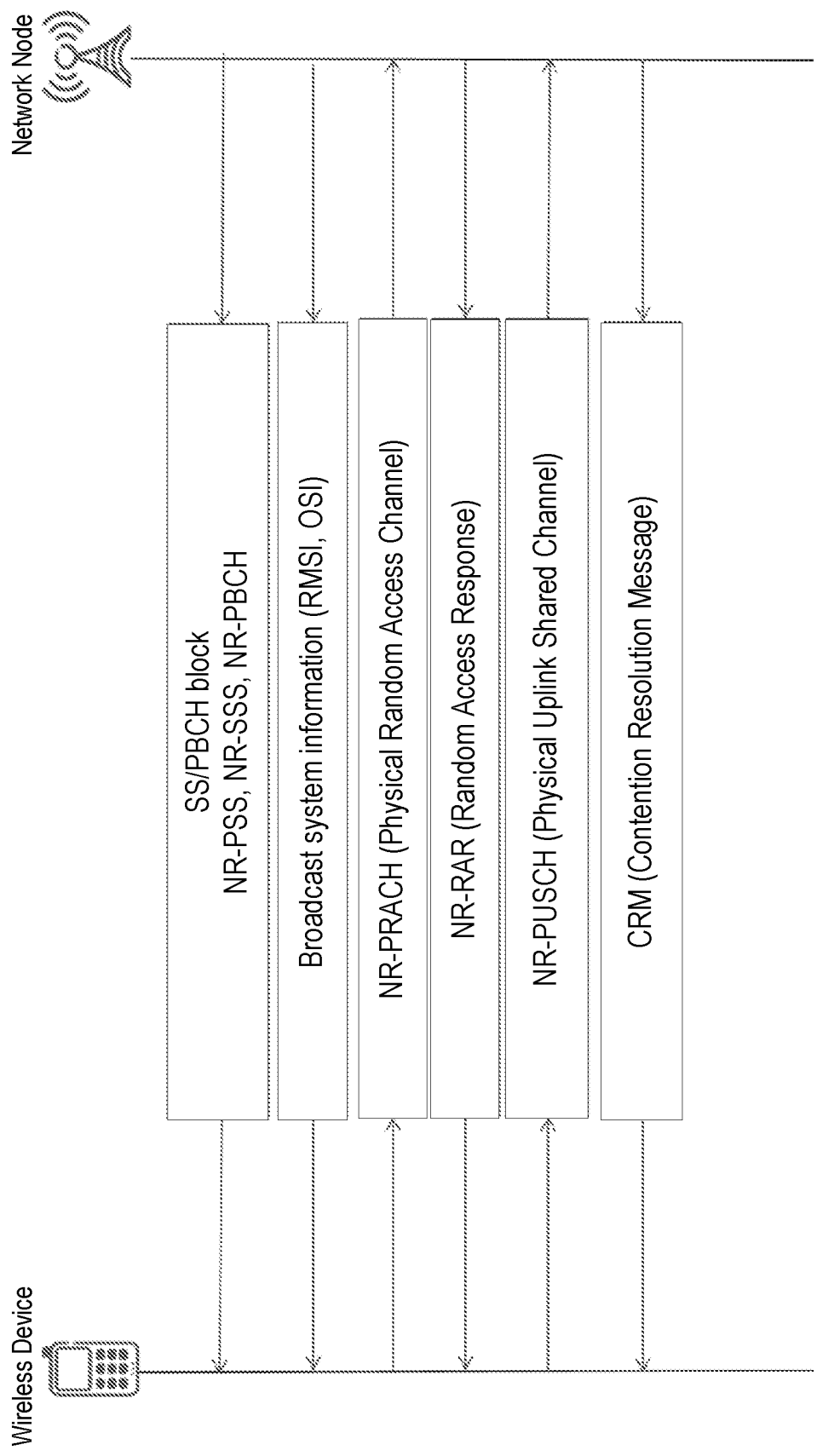
FIG. 1 is a diagram of signals exchanged between a network node and a wireless device.

Before describing in detail exemplary embodiments, it is noted that the embodiments reside primarily in combinations of apparatus components and processing steps related to resource block assignment for MSG3 transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (WD) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, IAB, Multi-cell/multicast Coordination Entity (MCE), relay node, access point, radio access point, Remote Radio Unit (RRU) Remote Radio Head (RRH).

It should be understood that, in some embodiments, signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgment signaling processes, e.g. representing and/ or pertaining to one or more such processes. Signaling associated to a channel may be transmitted such that it represents signaling and/or information for that channel, and/or that the signaling is interpreted by the transmitter and/or receiver to belong to that channel. Such signaling may generally comply with transmission parameters and/or format/s for the channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that the RRC signaling as described herein may indicate what subframes or signals to use for one or more of the measurements described herein and under what conditions and/or operational modes.

Configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for determining a fixed size resource block assignment in random access response, RAR, scheduling of MSG3 transmission based at least in part on at least one of bandwidth part size, slot/non-slot transmission and resource allocation type, are disclosed. Some embodiments reduce a number of bits needed to indicate resource block size to be allocated by the WD for MSG3 message transmission.

For an RAR grant in NR, note that the RAN2 technical standards entity already has decided on 20 bits for UL grant in RAR, which has the same size as the RAR grant in LTE. It may be natural to use a similar RAR grant structure for NR, but certain NR specific design factors need to be considered. These factors include the following:

For truncated modulation and coding scheme, LTE can be followed by truncating MCS tables by only using the first 16 rows of a MCS table without 256 quadrature amplitude modulation (QAM). The specific MCS table used depends on if the network configures OFDM or discrete Fourier transform (DFT)-S-OFDM for the uplink transmission.

For TPC command for scheduled PUSCH, LTE can be followed with 3 bits to indicate a value in the range from −6 dB to 8 dB with a 2 dB step size.

For the CSI request field, it could be good to for the network node to get a CSI report directly during a handover, so we propose to keep this 1-bit field.

For time domain assignment, note that an LTE RAR grant is based on an implicit rule, i.e., the UL-SCH transport block is scheduled in the first available UL subframe n+k1, k1>=6, and the transmission is postponed to the next available UL subframe if the UL delay field is set to 1. NR supports both slot based and non-slot based MSG3 transmissions. For the non-slot based transmission, 2, 4 and 7 OFDM-symbol durations for the PUSCH is supported. In NR, the WD can be configured with a time domain assignment table of 16 rows giving the OFDM symbols used for PUSCH transmission. For RAR grant, it is proposed to use 2 bits for time domain assignment to indicate an entry in a truncated time domain assignment table of 4 rows configured by RMSI and/or RRC.

For frequency hopping flag, RAN1 has agreed that intra-slot frequency hopping is supported for MSG3, and thus a 1-bit hopping flag is needed for RAR grant in NR.

Figure 2:
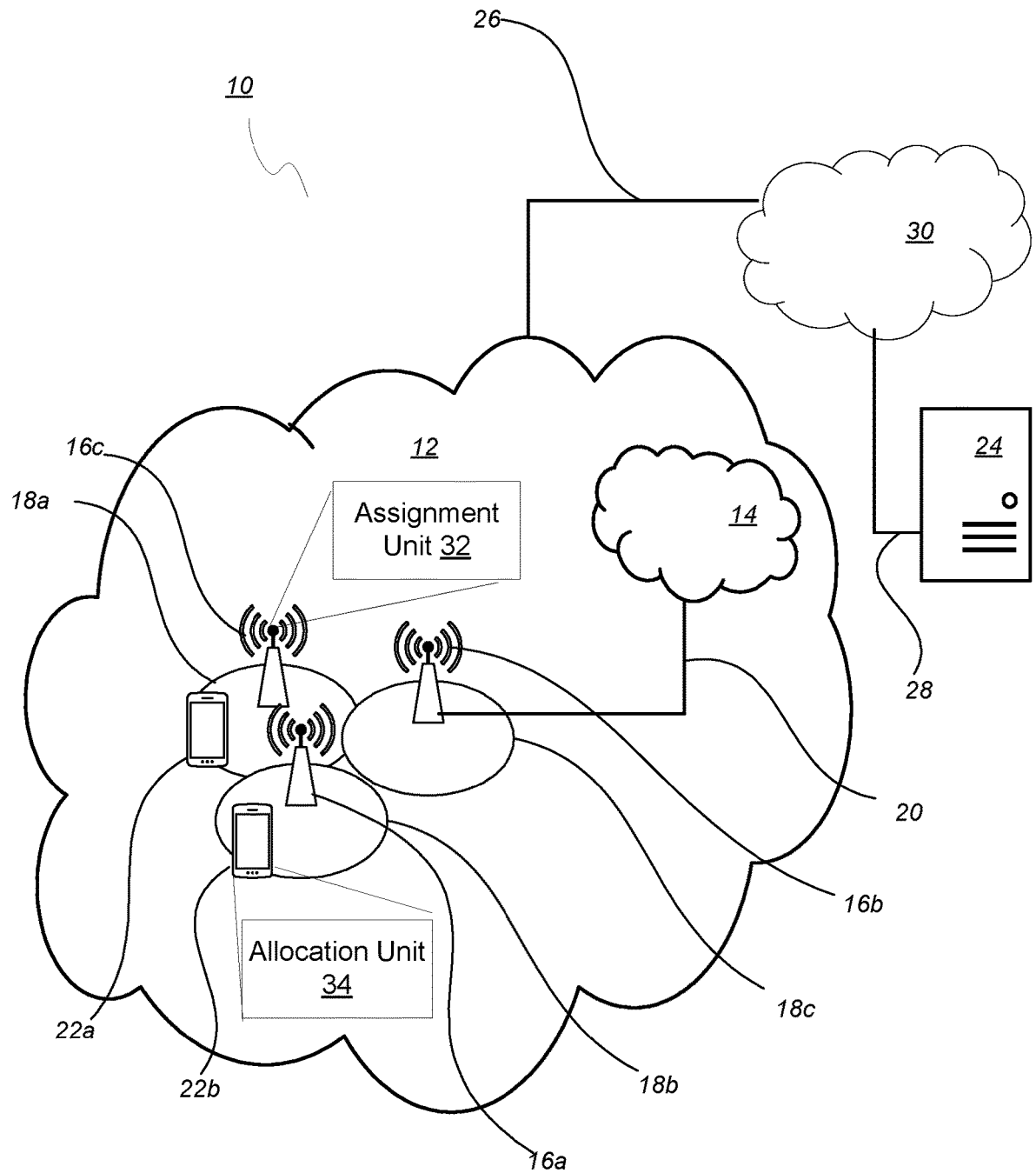
FIG. 2 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16*a*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WS 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an assignment unit 32 which is configured to determine a fixed size resource block, RB, assignment in random access response, RAR, scheduling of MSG3 transmission based at least in part on at least one of bandwidth part size, whether transmission is one of slot and non-slot transmission and resource allocation type. A wireless device 22 is configured to include an allocation unit 34 which is configured to allocate RBs to the MSG3 transmission according to the assignment.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include assignment unit 32 configured to determine a fixed size resource block, RB, assignment in random access response, RAR, scheduling of MSG3 transmission based at least in part on at least one of bandwidth part size, whether transmission is one of slot and non-slot transmission and resource allocation type.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an allocation unit 34 configured to allocate RBs to the MSG3 transmission according to an assignment received from a network node.

Figure 3:
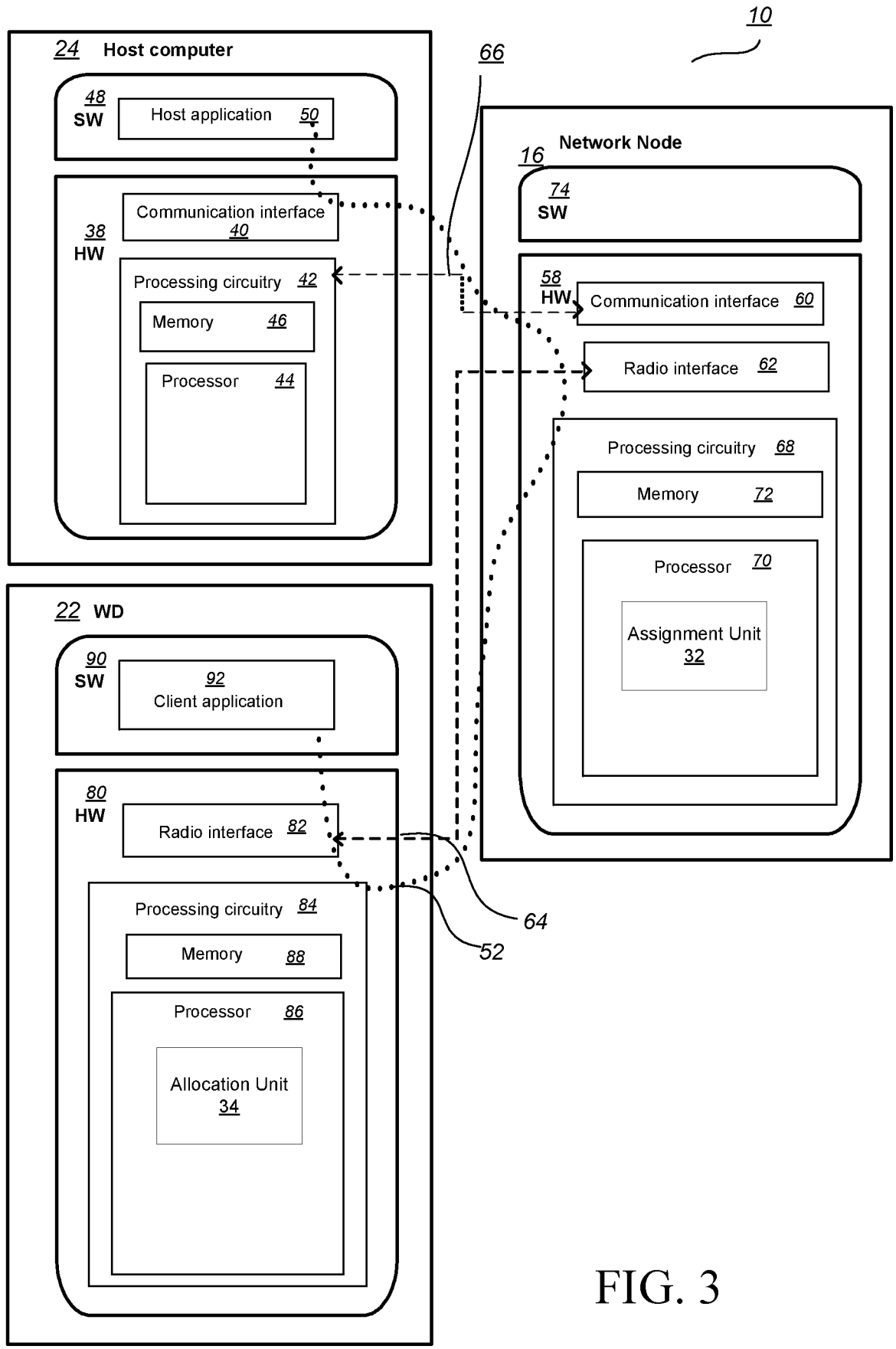
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as assignment unit 32, and allocation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
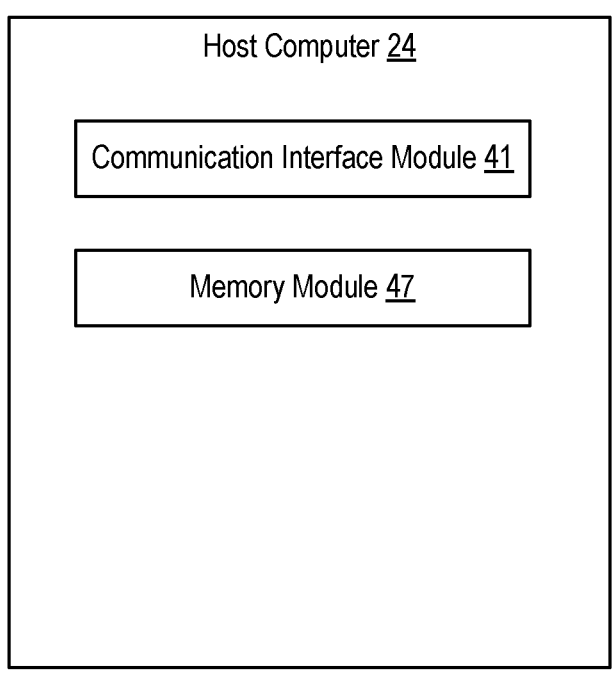
FIG. 4 is a block diagram of an alternative embodiment of a host computer according to some embodiments of the present disclosure.

FIG. 4 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein.

Figure 5:
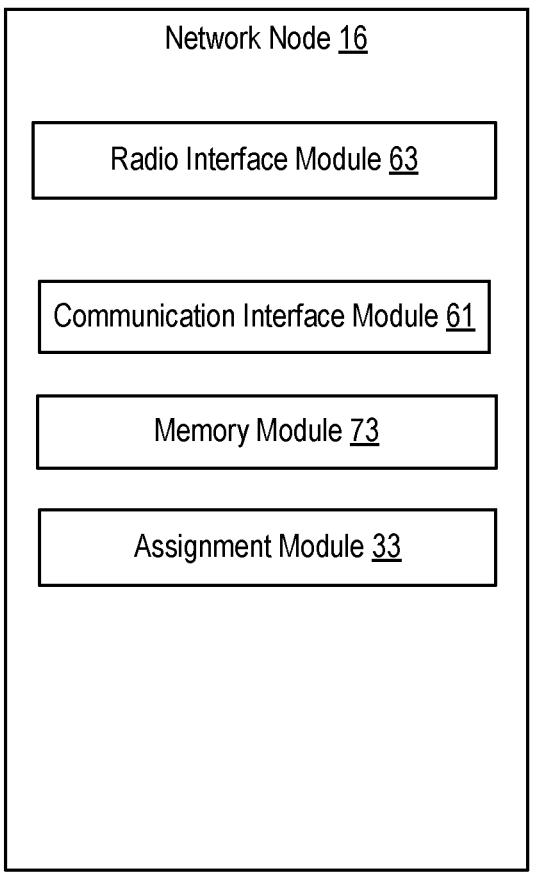
FIG. 5 is a block diagram of an alternative embodiment of a network node according to some embodiments of the present disclosure.

FIG. 5 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The assignment module 33 is configured to determine a fixed size resource block, RB, assignment in random access response, RAR, scheduling of MSG3 transmission based at least in part on at least one of bandwidth part size, whether transmission is one of slot and non-slot transmission and resource allocation type.

Figure 6:
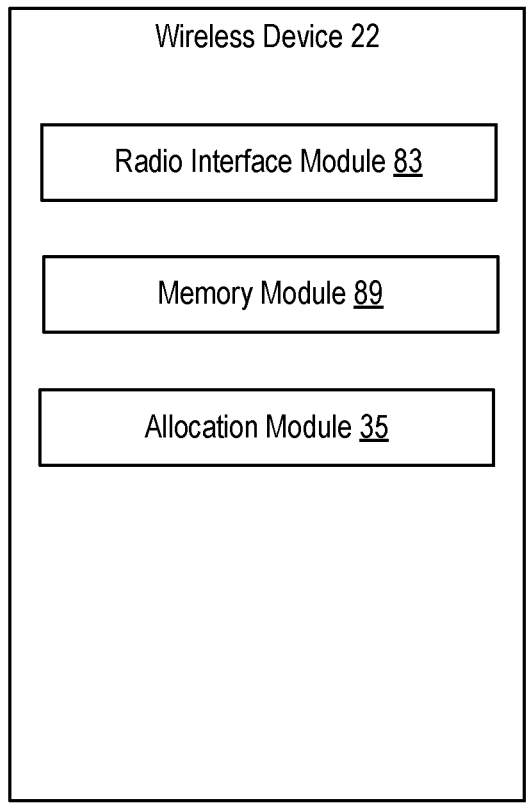
FIG. 6 is a block diagram of an alternative embodiment of a wireless device according to some embodiments of the present disclosure.

FIG. 6 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The allocation module 35 is configured to allocate RBs to the MSG3 transmission according to an assignment received from a network node.

Figure 7:
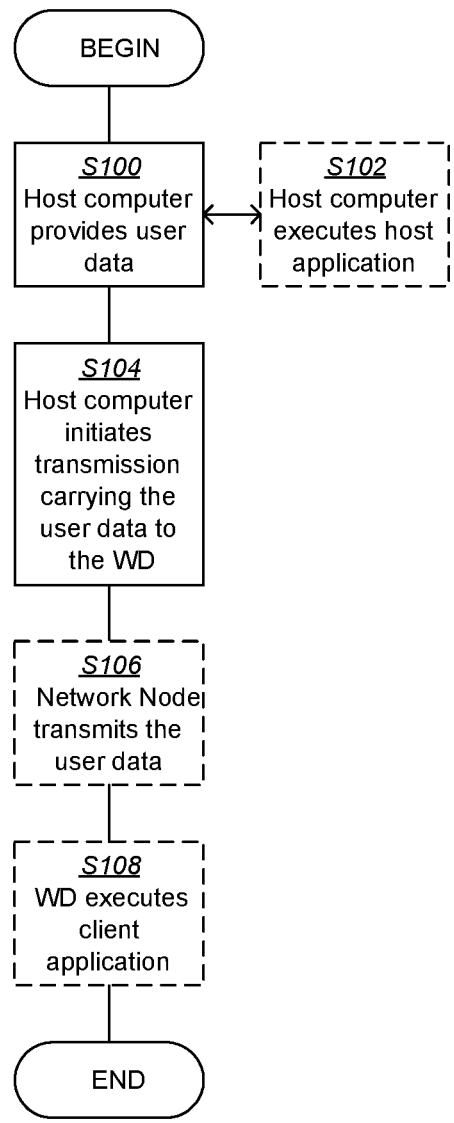
FIG. 7 is a flowchart illustrating exemplary methods implemented in a communication system including a host computer, a network node and a wireless device for executing a client application at a wireless device according to some embodiments of the present disclosure.

FIG. 7 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (block S100). In an optional substep of the first step, the host computer 24 provides the user data by executing a host application, such as, for example, the host application 50 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 92, associated with the host application 50 executed by the host computer 24 (block S108).

Figure 8:
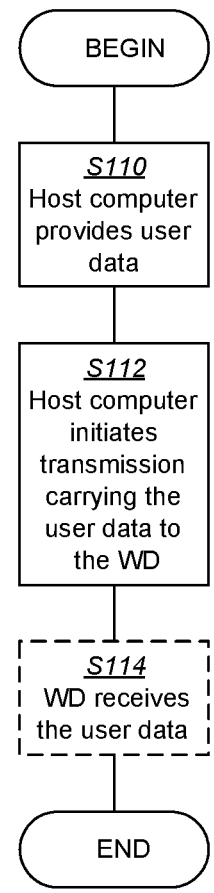
FIG. 8 is a flowchart illustrating exemplary methods implemented in a communication system including a host computer, a network node and a wireless device for receiving user data at a wireless device according to some embodiments of the present disclosure.

FIG. 8 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (block S110). In an optional substep (not shown) the host computer 24 provides the user data by executing a host application, such as, for example, the host application 50. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 9 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (block S116). In an optional substep of the first step, the WD 22 executes the client application 92, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 92 (block S122). In providing the user data, the executed client application 92 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
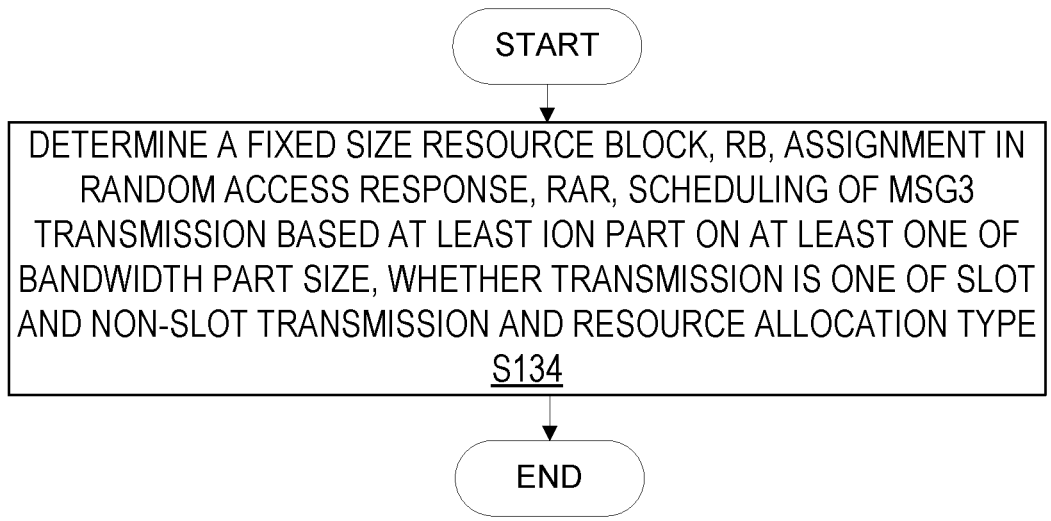
FIG. 11 is a flowchart of an exemplary process in a network node for RB assignment for MSG3 messaging according to some embodiments of the present disclosure.

FIG. 11 is a flowchart of an exemplary process in a network node 16 for RB assignment according to the principles set forth herein. The process includes determining, via the assignment unit 32, a fixed size resource block, RB, assignment in random access response, RAR, scheduling of MSG3 transmission based at least in part on at least one of bandwidth part size, whether transmission is one of slot and non-slot transmission and resource allocation type (block S134).

Figure 12:
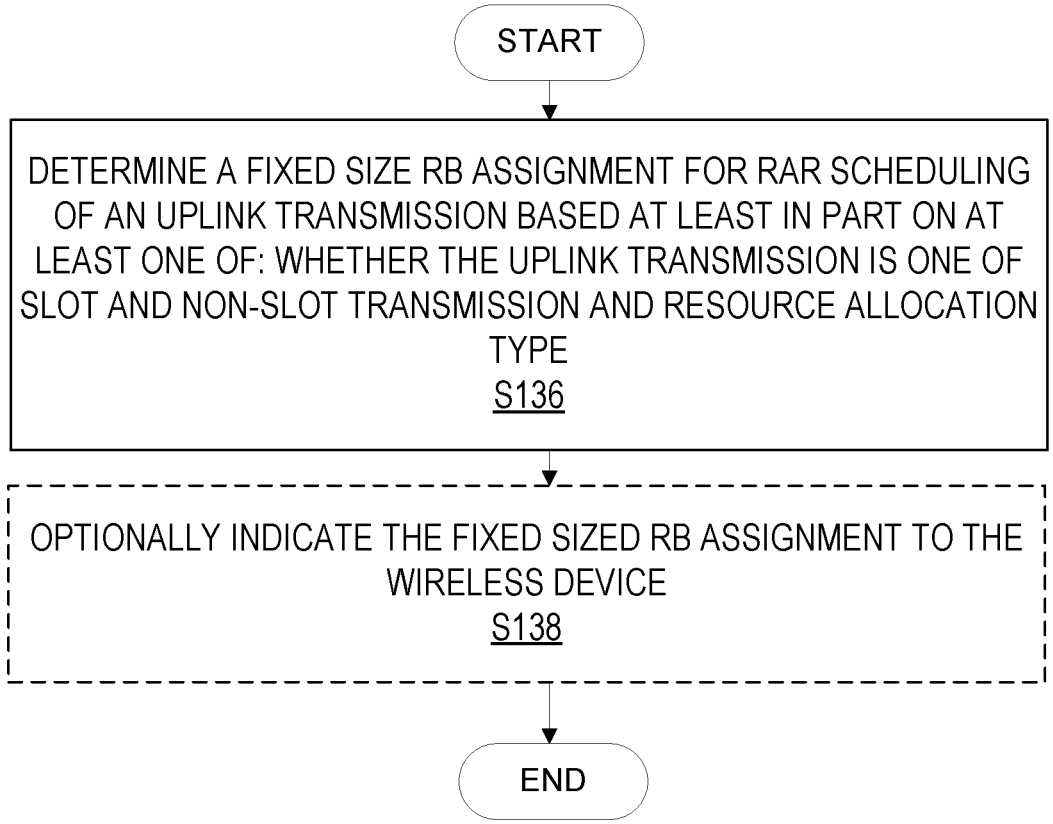
FIG. 12 is a flowchart of another exemplary process in a network node for RB assignment for MSG3 messaging according to some embodiments of the present disclosure.

FIG. 12 is a flowchart of another exemplary process in a network node 16 for RB assignment according to the principles set forth herein. One or more Blocks and/or functions performed by network node 16 may be performed by one or more elements of network node 16 such as by assignment unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to determine (block 136) a fixed size resource block, RB, assignment for random access response, RAR, scheduling of an uplink transmission based at least in part on at least one of: whether the uplink transmission is one of slot and non-slot transmission, resource allocation type, as described herein. In one or more embodiments, network node 16 such as via one or more of processing circuitry 68, processor 70, radio interface 62 and communication interface 60 is configured to optionally indicate (block S138) the fixed sized RB assignment to the wireless device 22, as described herein.

According to one or more embodiments of this aspect, the fixed size RB assignment indicates a RB granularity where the RB granularity is based at least in part on one of a bandwidth part size and transmission duration. According to one or more embodiments of this aspect, the RB granularity indicates a RB start position and quantity of RBs for the uplink transmission. According to one or more embodiments of this aspect, the uplink transmission corresponds to a message 3, MSG3, transmission. According to one or more embodiments of this aspect, the fixed sized RB assignment is indicated in a message 2, MSG2, transmission.

According to one or more embodiments of this aspect, the fixed sized RB assignment is based at least in part on a bandwidth part size. According to one or more embodiments of this aspect, the uplink transmission is the non-slot transmission having a time duration less than a slot. According to one or more embodiments of this aspect, the fixed size RB assignment corresponds to a subset of RBs in a bandwidth part size based at least in part on a threshold. According to one or more embodiments of this aspect, the threshold is based at least in part on a transmission duration. According to one or more embodiments of this aspect, the fixed size RB assignment assigns RBs corresponding to one of: lowest RB values of a group of RBs, highest RB values of the group of RBs, and middle RB values of the group of RBs.

Figure 13:
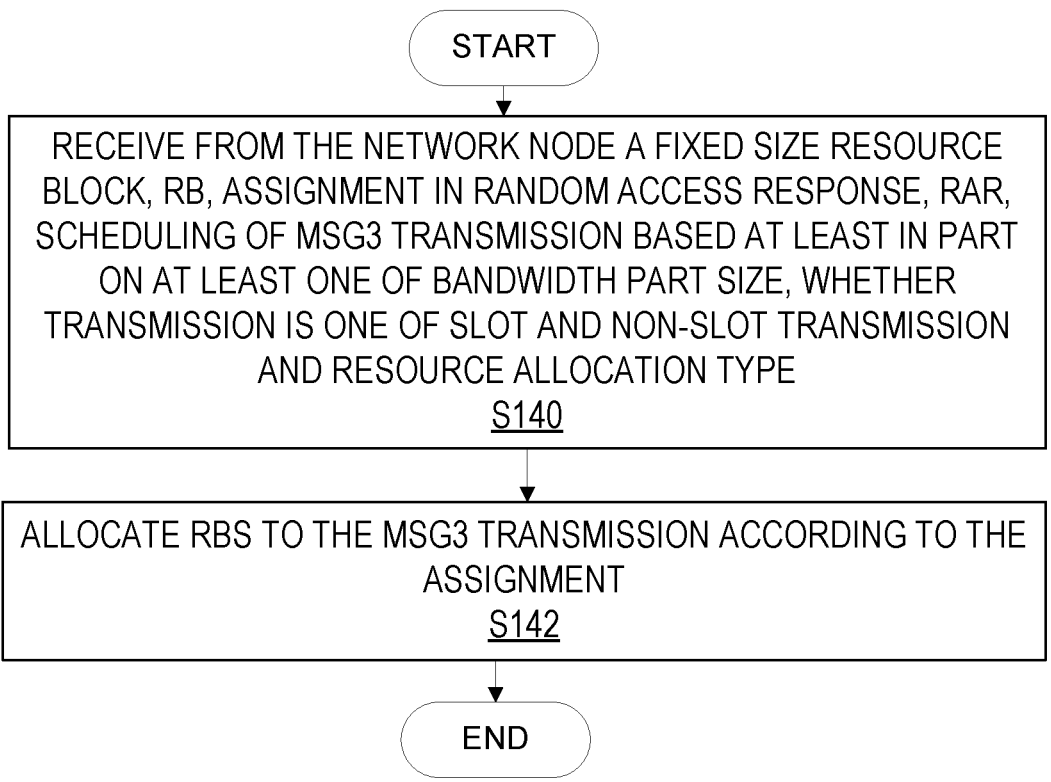
FIG. 13 is a flowchart of an exemplary process in a wireless device for RB allocation for MSG3 messaging according to some embodiments of the present disclosure.

FIG. 13 is a flowchart of an exemplary process in a wireless device 22 according to some embodiments of the present disclosure. The process includes receiving, via a radio interface 82, from the network node 16 a fixed size resource block, RB, assignment in random access response, RAR, scheduling of MSG3 transmission based at least in part on at least one of bandwidth part size, whether transmission is one of slot and non-slot transmission and resource allocation type (block S140). The process further allocates, via the allocation unit 34, RBs to the MSG3 transmission according to the assignment (block S142).

Figure 14:
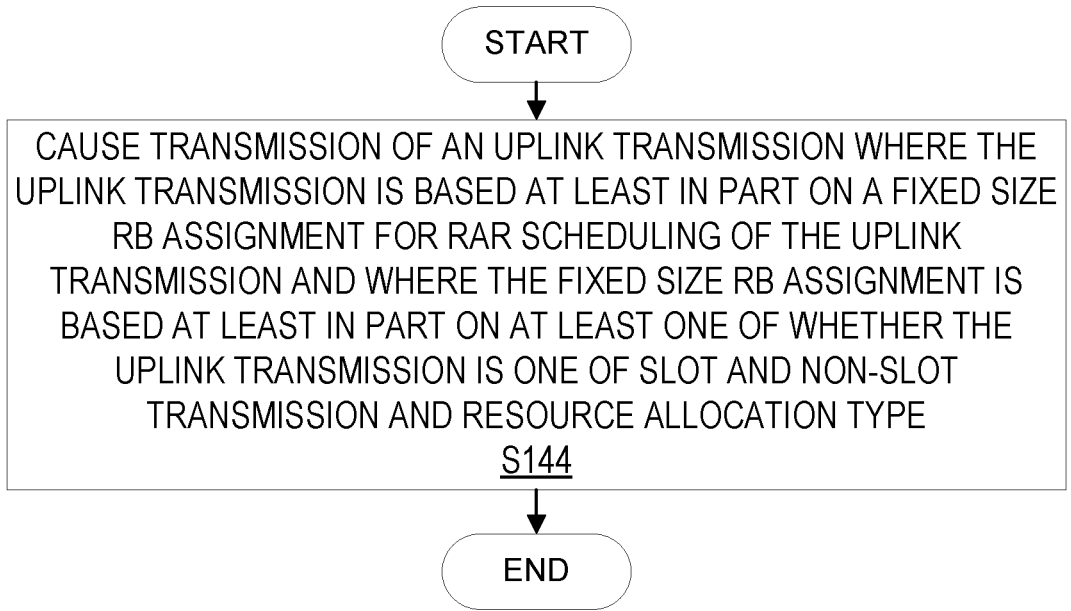
FIG. 14 is a flowchart of another exemplary process in a wireless device for RB allocation for MSG3 messaging according to some embodiments of the present disclosure.

FIG. 14 is a flowchart of an exemplary process in a wireless device 22 according to some embodiments of the present disclosure. One or more Blocks and/or functions performed by wireless device 22 may be performed by one or more elements of wireless device 22 such as by allocation unit 34 in processing circuitry 84, processor 86, radio interface 82, etc. In one or more embodiments, wireless device 22 such as via one or more of processing circuitry 84, processor 86 and radio interface 82 is configured to cause (block S144) transmission of an uplink transmission where the uplink transmission is based at least in part on a fixed size resource block, RB, assignment for RAR scheduling of the uplink transmission and where the fixed size RB assignment is based at least in part on at least one of: whether the uplink transmission is one of slot and non-slot transmission and resource allocation type, as described herein.

According to one or more embodiments of this aspect, the fixed size RB assignment indicates a RB granularity where the RB granularity is based at least in part on one of a bandwidth part size and transmission duration. According to one or more embodiments of this aspect, the RB granularity indicates a RB start position and quantity of RBs for the uplink transmission. According to one or more embodiments of this aspect, the uplink transmission corresponds to a message 3, MSG3, transmission. According to one or more embodiments of this aspect, the fixed sized RB assignment is indicated in a message 2, MSG2, transmission.

According to one or more embodiments of this aspect, the fixed sized RB assignment is based at least in part on a bandwidth part size. According to one or more embodiments of this aspect, the uplink transmission is the non-slot transmission having a time duration less than a slot. According to one or more embodiments of this aspect, the fixed size RB assignment corresponds to a subset of RBs in a bandwidth part size based at least in part on a threshold. According to one or more embodiments of this aspect, the threshold is based at least in part on a transmission duration. According to one or more embodiments of this aspect, the fixed size RB assignment assigns RBs corresponding to one of: lowest RB values of a group of RBs, highest RB values of the group of RBs, and middle RB values of the group of RBs.

The fixed size resource block assignment in RAR grant scheduling MSG3 transmission in NR can consider the BWP size, slot vs. non-slot based transmission, and resource allocation type.

Embodiment 1: In some embodiments, the fixed size resource block assignment in RAR grant indicating start RB position and RB length uses x-RB granularity, where x>=1 and takes into account at least the BWP size, slot vs. non-slot based transmission, and resource allocation type.

In this embodiment, unlike the fixed size resource block assignment in LTE RAR grant where start RB position and RB length are fixed at the granularity of 1 RB, the assignment granularity is a function of BWP size and/or transmission duration.

Example 1.1: The x-RB granularity values are fixed in the spec. Table 2 provides an example of how the x-RB granularity may vary depending on BWP size and/or transmission duration.

TABLE 2

Illustration example of x-RB granularity of start RB position and RB length for fixed size resource block assignment in RAR grant

| # of RBs in a BWP: N_RB | N_RB <= 94 | 94 < N_RB <= 188 | 188 < N_RB |
|---|---|---|---|
| Slot based | 1 RB | 2 RB | 4 RB |
| 7 symbols | 2 RB | 4 RB | 8 RB |
| 4 symbols | 4 RB | 8 RB | 16 RB |
| 2 symbols | 8 RB | 16 RB | 32 RB |

Example 1.2: The x-RB granularity can be configured in system information (e.g., remaining minimum system information (RMSI)) and/or radio resource control (RRC). For example, a set of RB granularity values {1, 2, 4, 8, 16, 32, 64} may be chosen as the set of configurable parameters, and RMSI can configure the used RB granularity values for different BWP sizes and/or transmission durations, and optionally RRC may reconfigure the used RB granularity values Embodiment 2: The fixed size resource block assignment in the RAR grant indicating start RB position and RB length uses x-RB granularity and is applicable to a subset of RBs in a BWP if the BWP size is larger than a threshold, i.e., based at least in part on a threshold.

In this embodiment, the range of RBs that may be assigned to MSG3 transmission is limited to a subset of all the RBs in a BWP if the BWP is larger than a threshold. The threshold values may be different depending on transmission durations. The threshold values may be fixed in the spec or configured in system information (e.g. RMSI) and/or RRC.

Example 2.1: For slot based transmission, if a BWP size is larger than N_th (e.g., N_th=94 RBs), the fixed size resource block assignment indicating start RB position and RB length with 1-RB granularity is used to assign the RBs from the lowest N_th RBs in the BWP or from the highest N_th RBs in the BWP or from the center N_th RBs in the BWP.

Embodiment 3: The fixed size resource block assignment in RAR grant uses a fixed size bitmap of RB groups (RBGs) to indicate RBs assigned to MSG3 transmission.

In this embodiment, a fixed size bitmap of RBGs is used to indicate RBs assigned to MSG3 transmission. Assume the length of the bitmap is x (e.g., if the field of fixed size resource bock assignment has 10 bits, x=10 without frequency hopping, or x=8 if 2 bits are excluded and used for frequency hopping indication). Assume the BWP has a size of N_RB. If floor (N_RB/x)>=1, each bit indicates if the corresponding floor(N_RB/x) RBs are assigned to MSG3 transmission. If floor(N_RB/x)<1, i.e., N_RB<x, then each bit of N_RB bits out of x bits is used to indicate if the corresponding RB is assigned and the rest of x−N_RB bits are reserved.

Example 3.1: For a BWP with 94 RBs and 10-bit bitmap, the i-th bit, i=0, . . . , 9, indicates if the set of 9 RBs from 9*i, 9*i+1, . . . , to 9*i+8 is assigned for MSG3 transmission.

Example 3.2: For a BWP with 8 RBs and 10-bit bitmap, each bit of the 8 bits out of 10 bits is used to indicate if the corresponding RB is assigned and the rest of 2 bits are reserved.

This embodiment 3 may not be efficient when BWP size is large. In particular, MSG3 is small payload of usually less than 20 bytes. For example, in Example 3.1, the RB assignment granularity is 9, which may be too large for MSG3. With limited number (<=10) of bits for fixed size resource block assignment, we can limit RAR grant within a subset of large BWP to get finer RB assignment granularity, which motives the following embodiment.

Embodiment 4: The fixed size resource block assignment in the RAR grant uses a fixed size bitmap of RBGs to indicate RBs within a subset of RBs in a BWP if the BWP size is larger than a threshold.

In this embodiment, the range of RBs that may be assigned to MSG3 transmission is limited to a subset of all the RBs in a BWP if the BWP size is larger than a threshold. The threshold values may be different depending on transmission durations. The threshold values may be fixed in the spec or configured in system information (e.g. RMSI) and/or RRC.

Example 4.1: For slot based transmission, if a BWP size is larger than N_th (e.g., N_th=20 RBs) and a fixed size of 10-bit bitmap is used, the fixed size resource block assignment using the bitmap is used to assign the RBs from the lowest N_th RBs in the BWP or from the highest N_th RBs in the BWP or from the center N_th RBs in the BWP or from a part of N_th-RBs configured by RSMI or RRC. The i-th bit, i=0, . . . , 9, indicates if the set of 2 RBs, 2*i, 2*i+1, in the N_th RBs are assigned for MSG3 transmission.

Embodiment 5: The fixed size resource block assignment in the RAR grant uses a fixed size bitmap of RBGs and a RBG size to indicate assigned RBs in a BWP or within a subset of RBs in a BWP if the BWP size is larger than a threshold that may depend on RBG size.

In this embodiment, a RBG size can be configured by the network that may depend on BWP sizes and/or transmission durations, or RBG sizes corresponding to different BWP sizes and/or transmission durations can be fixed in the spec. Then each bit in the fixed size bitmap indicates if the RBs in the corresponding RBG are assigned. Assume the length of the bitmap is x, the RBG size is y, and the BWP has N_RB RBs. If x*y>=N_RB, then each bit of the ceil(N_RB/y) bits out of the x bits is used to indicate if the corresponding RBG is assigned and the rest of x−ceil(N_RB/y) bits are reserved. If x*y<N_RB, then a subset of x*y RBs out of the BWP can be assigned and each bit of the x bits is used to indicate if the corresponding RBG is assigned. The subset of x*y RBs can be the lowest x*y RBs in the BWP or the highest x*y RBs in the BWP or the center x*y RBs in the BWP. This can be either fixed or configured.

Below are two examples to illustrate this embodiment.

Example 5.1: Assume the length of the bitmap is x=10, the RBG size is y=8, and the BWP has N_RB=48 RBs. This may be used for non-slot based MSG3 transmission. Since x*y=80>N_RB=48, each bit of the ceil(48/8)=6 bits out of the 10 bits is used to indicate if the corresponding RBG is assigned and the rest of 10−6=4 bits are reserved.

Example 5.2: Assume the length of the bitmap is x=10, the RBG size is y=2, and the BWP has N_RB=48 RBs. This may be used for slot based MSG3 transmission. Since x*y=20<N_RB=48, the bitmap can only indicate a subset of x*y=20 RBs out of the 48-RB BWP and each bit of the x=10 bits is used to indicate if the corresponding RBG is assigned. The 20 RBs that can be assigned can be the lowest 20 RBs in the BWP or the highest 20 RBs in the BWP or the center 20 RBs in the BWP, depending on the fixed rule or configuration.

Embodiment 6: The fixed size resource assignment in the RAR grant indicates jointly the time domain allocation and frequency domain allocation. The granularities in frequency and time take into account at least the BWP size, slot vs. non-slot based transmission, and resource allocation type.

In the previous embodiments, time domain allocation and frequency domain allocation may be considered separately. It can be observed that, in some cases, the number of bits necessary for frequency domain allocation may be less than assigned, which leaves some bits unused in the RAR grant.

Figure 15:
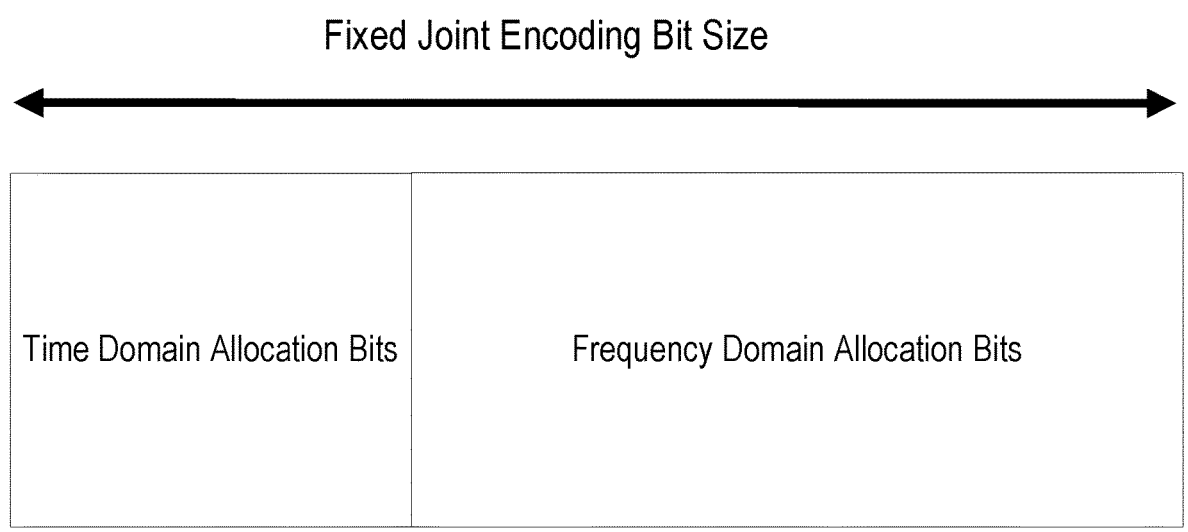
FIG. 15 is a diagram of a general encoding of the joint time and frequency domain resource assignment.

In this embodiment, the granularities in frequency and time domains can be jointly considered in order to maximize the utility of bits in the RAR grant. If there are fewer time domain allocation candidates, then more bits are assigned for frequency domain resource allocation by adopting a smaller frequency domain granularity. If there are more time domain allocation candidates, then fewer bits are assigned for frequency domain resource allocation by adopting a larger frequency domain granularity. A general encoding of the joint time and frequency domain resource assignment has the following form is shown in FIG. 15.

Within the fixed number of resource allocation bits, the first part of the bits indicates the time domain allocation and the second part indicates the frequency domain allocation. The encoding of the time domain resource allocation should provide non-ambiguous indication of the time domain scheduling type. One nonlimiting example of such time domain resource allocation is to enforce a prefix structure. Nonlimiting examples are explained in the following.

Figure 16:
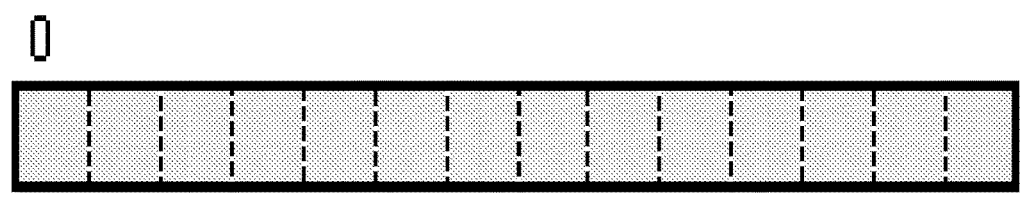
FIG. 16 depicts signaling of slot based scheduling for a first bit of "0"
Figure 17:
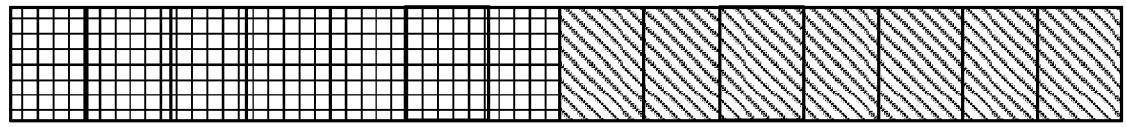
FIG. 17 depicts signaling of non-slot based scheduling using a first three bits.
Figure 18:
FIG. 18 depicts signaling of non-slot based scheduling using a first 5 bits.
Figure 18:
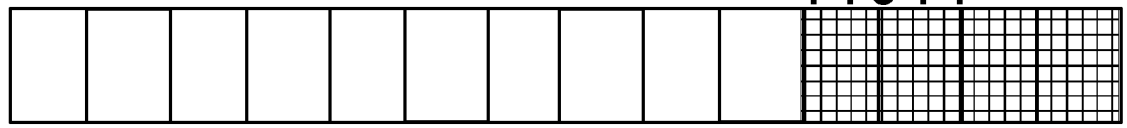
Figure 19:
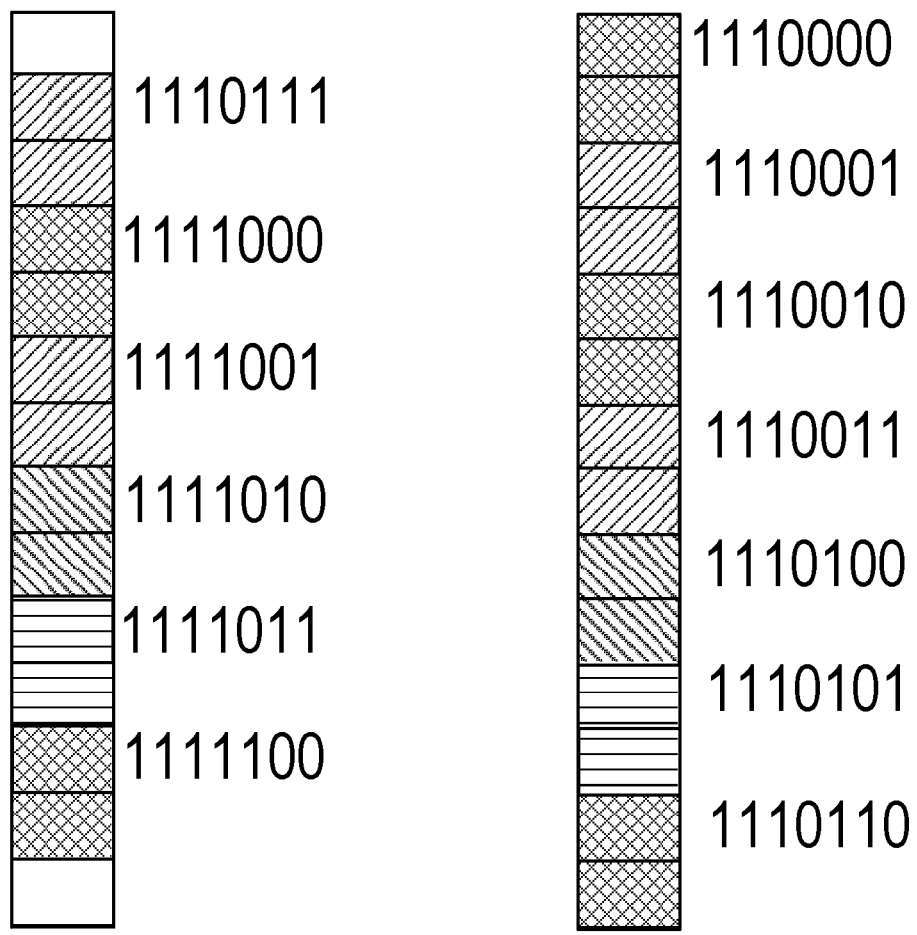
FIG. 19 depicts signaling of non-slot based scheduling using a first 7 bits.
Figure 20:
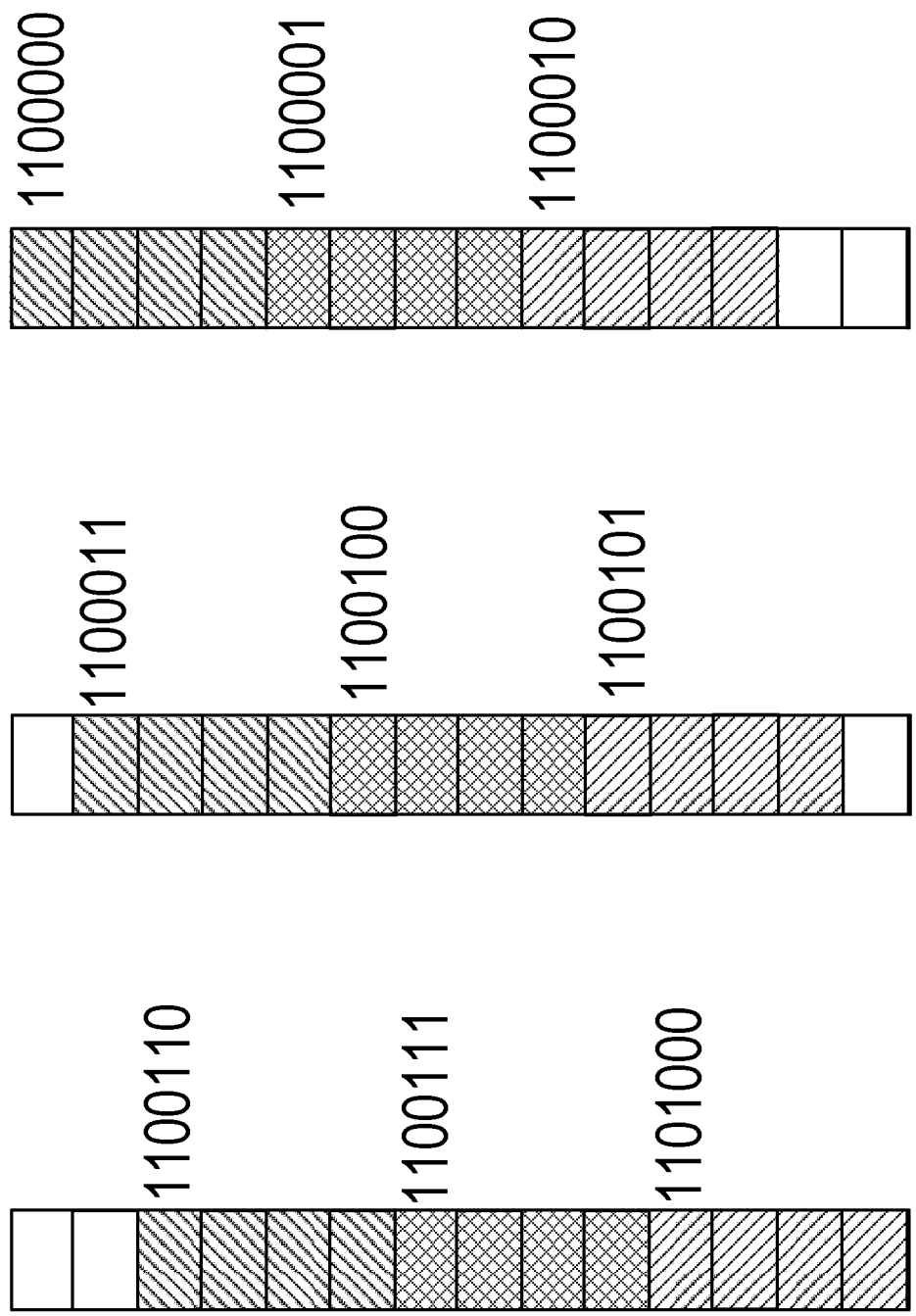
FIG. 20 depicts signaling of non-slot based scheduling using 7 bits for encoding nine time domain allocation candidates.

Consider a BWP of N_RB=94 RBs in size and frequency domain granularities as shown in Table 2. It can be calculated that the numbers of bits needed for frequency domain allocation are as follows for the different time domain scheduled transmission durations:

i) For slot based: 13 bits for frequency domain allocation ii) For 7-symbol non-slot based: 11 bits for frequency domain allocation iii) For 4-symbol non-slot based: 9 bits for frequency domain allocation iv) For 2-symbol non-slot based: 7 bits for frequency domain allocation If a total of 14 bits are assigned for joint time and frequency domain resource allocation, there will be i) For slot based: 1 bit for time domain allocation ii) For 7-symbol non-slot based: 3 bits for time domain allocation iii) For 4-symbol non-slot based: 5 bits for time domain allocation iv) For 2-symbol non-slot based: 7 bits for time domain allocation If the first bit is '0', then a slot based scheduling is signaled as shown in FIG. 16. If the first bit is '1', then a non-slot scheduling is signaled. If the first two bits are '10', then a 7-symbol non-slot based scheduling is signaled and the two candidates are indicated using the first 3 bits as follows as shown in FIG. 17. If the first three bits are '110', then a 4-symbol non-slot based scheduling is signaled and the four candidates are indicated using the first 5 bits as shown in FIG. 18. If the first three bits are '111', then a 2-symbol non-slot based scheduling is signaled and the fourteen candidates are indicated using the first 7 bits as shown in FIG. 19. If it is decided that more 4-symbol non-slot based scheduling candidates are needed, then embodiments teach that the frequency domain granularity should be reduced to allow more bits for encoding the time domain candidates. For instance, if the frequency domain granularity is changed to 8 RBs for 4-symbol non-slot based scheduling, then the frequency domain resource allocation only needs 7 bits. This leaves 7 bits to encode the following nine time domain allocation candidates, as shown in FIG. 20.

Some Examples

Example A1. A network node 16 configured to communicate with a wireless device 22 (WD 22), the network node 16 configured to, and/or comprising a radio interface 62 and/or comprising processing circuitry 68 configured to:

determine a fixed size resource block, RB, assignment in random access response, RAR, scheduling of MSG3 transmission based at least in part on at least one of bandwidth part size, whether transmission is one of slot and non-slot transmission and resource allocation type.

Example A2. The network node 16 of Example A1, wherein the fixed size RB assignment indicates a start RB position and an RB length using a specified RB granularity.

Example A3. The network node 16 of Example A2, wherein the fixed size RB assignment is applicable to a subset of RBs in a bandwidth part if the bandwidth part sized exceeds a threshold.

Example A4. The network node 16 of Example A1, wherein the fixed size RB assignment uses a fixed size bitmap of RB groups to indicate RBs assigned to MSG3 transmission.

Example A5. The network node 16 of Example A1, wherein the fixed size RB assignment uses a fixed size bitmap of RB groups to indicate RBs within a subset of RBs in a bandwidth part if the bandwidth part size exceeds a threshold.

Example A6. The network node 16 of any of Examples A3 and A5, wherein the threshold depends on a size of an RB group.

Example A7. The network node 16 of Example A1, wherein the fixed size RB assignment jointly indicates a time domain allocation and a frequency domain allocation, the granularities of the frequency and time domain allocations based at least in part on at least one of bandwidth part size, whether transmission is one of slot and non-slot transmission and resource allocation type.

Example B1. A method implemented in a network node 16, the method comprising:

determining a fixed size resource block, RB, assignment in random access response, RAR, scheduling of MSG3 transmission based at least in part on at least one of bandwidth part size, whether transmission is one of slot and non-slot transmission and resource allocation type.

Example B2. The method of Example B1, wherein the fixed size RB assignment indicates a start RB position and an RB length using a specified RB granularity.

Example B3. The method of Example B2, wherein the fixed size RB assignment is applicable to a subset of RBs in a bandwidth part if the bandwidth part sized exceeds a threshold.

Example B4. The method of Example B1, wherein the fixed size RB assignment used a fixed size bitmap of RB groups to indicate RBs assigned to MSG3 transmission.

Example B5. The method of Example B1, wherein the fixed size RB assignment uses a fixed size bitmap of RB groups to indicate RBs within a subset of RBs in a bandwidth part if the bandwidth part size exceeds a threshold.

Example B6. The method of any of Example s B3 and B5, wherein the threshold depends on a size of an RB group.

Example B7. The method of Example B1, wherein the fixed size RB assignment indicates jointly, a time domain allocation and a frequency domain allocation, the granularities of the frequency and time domain allocations based at least in part on at least one of bandwidth part size, whether transmission is one of slot and non-slot transmission and resource allocation type.

Example C1. A wireless device 22 (WD 22) configured to communicate with a network node 16, the WD 22 configured to, and/or comprising a radio interface 82 and/or processing circuitry 84 configured to:

receive from the network node 16 a fixed size resource block, RB, assignment in a random access response, RAR, scheduling of MSG3 transmission based at least in part on at least one of bandwidth part size, whether transmission is one of slot and non-slot transmission and resource allocation type; and allocate RBs to the MSG3 transmission according to the assignment.

Example D1. A method implemented in a wireless device 22 (WD 22), the method comprising:

receiving from the network node 16 a fixed size resource block, RB, assignment in a random access response, RAR, scheduling of MSG3 transmission based at least in part on at least one of bandwidth part size, whether transmission is one of slot and non-slot transmission and resource allocation type; and allocating RBs to the MSG3 transmission according to the assignment.

Example E1. A network node 16, comprising:

a memory module 73 configured to store a resource block, RB, assignment; and an assignment module 33 configured to determine a fixed size resource block, RB, assignment in random access response, RAR, scheduling of MSG3 transmission based at least in part on at least one of bandwidth part size, whether transmission is one of slot and non-slot transmission and resource allocation type.

Example E2. A wireless device 22, comprising:

a memory module 89 configured to store a resource block, RB, assignment; and an allocation module 35 configured to allocate RBs to the MSG3 transmission according to an assignment received from a network node 16.

Standardizing the Proposed Solutions

The sections below provide non-limiting examples of how certain aspects of the proposed solutions could be implemented within the framework of a specific communication standard. In particular, the below sections provide non-limiting examples of how the proposed solutions could be implemented within the framework of a 3GPP TSG RAN standard. The changes described by sections below are merely intended to illustrate how certain aspects of the proposed solutions could be implemented in a particular standard. However, the proposed solutions could also be implemented in other suitable manners, both in the 3GPP Specification and in other specifications or standards.

1. INTRODUCTION

In this contribution, we discuss the remaining DCI issues including RAR grant and PDCCH ordered RA that are needed to stabilize the basic and essential NR functionalities within the scope of the drop approved during RAN #78.

2. DISCUSSION 2.1 RAR Grant

As part of the random access procedure, after receiving Random Access Request in MSG1, gNB will provide the required information in MSG2-Random Access Response (RAR) message—for UE to send the MSG3 (RRC Connection Request). This is referred to the RAR Grant in the physical layer. In LTE, RAR Grant is a 20-bit message with contents from MSB to LSB as [1]

Hopping Flag—1 Bit

This is 1 bit of information which governs whether frequency hopping is enabled or not. If the value of the bit is 1 and resource block assignment is type 0, UE should perform PUSCH frequency hopping.

Fixed Size Resource Block Assignment—10 Bits if $N_{NB}^{UL} \leq 44$

Truncate the fixed size resource block assignment to its b least significant bits, where $b = \lceil \log_2(N_{RB}^{UL} \cdot (N_{RB}^{UL}+1)/2) \rceil$, and interpret the truncated resource block assignment according to the rules for a regular DCI format 0 else

Insert b most significant bits with value set to '0' after the $N_{UL\_hop}$ hopping bits in the fixed size resource block assignment, where the number of hopping bits $N_{UL\_hop}$ is zero when the hopping flag bit is not set to 1, and is defined in Table 8.4-1 when the hopping flag bit is set to 1, and $b = (\lceil \log_2(N_{RB}^{UL} \cdot (N_{RB}^{UL}+1)/2) \rceil - 10)$, and interpret the expanded resource block assignment according to the rules for a regular DCI format 0

Truncated Modulation and Coding Scheme—4 Bits

The truncated modulation and coding scheme field is interpreted such that the modulation and coding scheme corresponding to the Random Access Response grant is determined from MCS indices 0 through 15 in Table 8.6.1-1 from TS 36.213

TPC Command for Scheduled PUSCH—3 Bits

It is indicated in 3 bits as a TPC command whose value varies from 0 to 7. TPC command to power mapping is given in Table 6.2-1 from TS 36.213. The TPC command value ranges from −6 dB to 8 dB with a 2 dB step size If a UE is configured with a higher layer parameter pusch-EnhancementsConfig, then this field is used to indicate the Repetition number of MSG3

UL Delay—1 Bit

If a PDCCH with associated RA-RNTI is detected in subframe n, and the corresponding DL-SCH transport block contains a response to the transmitted preamble sequence, the UE shall, according to the information in the response, transmit an UL-SCH transport block in the first subframe n+k1, k1>=6, if the UL delay field is set to zero where n+k1 is the first available UL subframe for PUSCH transmission, where for TDD serving cell, the first UL subframe for PUSCH transmission is determined based on the UL/DL configuration (i.e., the parameter subframeAssignment) indicated by higher layers. The UE shall postpone the PUSCH transmission to the next available UL subframe after if the field is set to 1.

CSI Request—1 Bit

This 1 bit of information determines whether an aperiodic CQI, PMI and RI report can be included in the PUSCH transmission. For contention based Random access CSI field is reserved.

For RAR grant in NR, note that RAN2 already has decided on 20 bits for UL grant in RAR, which has the same size as the RAR grant in LTE. It is natural to use a similar RAR grant structure for NR, but certain NR specific design factors need to be considered. We elaborate these aspects in the following.

For truncated modulation and coding scheme, we can follow LTE by truncating MCS tables by only using the first 16 rows of a MCS table without 256QAM. The specific MCS table used depends on if the network configures OFDM or DFT-S-OFDM for the uplink transmission.

For TPC command for scheduled PUSCH, we can follow LTE with 3 bits to indicate a value in the range from −6 dB to 8 dB with a 2 dB step size.

For CSI request field, it could be good to for the gNB to get a CSI report directly during a handover, so we propose to keep this 1-bit field.

For time domain assignment, note that LTE RAR grant is based on an implicit rule, i.e., the UL-SCH transport block is scheduled in the first available UL subframe n+k1, k1>=6, and the transmission is postponed to the next available UL subframe after if the UL delay field is set to 1. NR supports both slot based and non-slot based MSG3 transmissions. For the non-slot based transmission, 2, 4 and 7 OFDM-symbol durations for the PUSCH is supported. In NR, UE can be configured with a time domain assignment table of 16 rows giving the OFDM symbols used for PUSCH transmission. For RAR grant, we propose to use 2 bits for time domain assignment to indicate an entry in a truncated time domain assignment table of 4 rows configured by RMSI and/or RRC.

For frequency hopping flag, RAN1 has agreed that intra-slot frequency hopping is supported for MSG3, and thus a 1-bit hopping flag is needed for RAR grant in NR.

For fixed size resource block assignment, similar to LTE RAR grant, we can use NR resource allocation type 1—contiguous RBs with start position and length. With fixed size 20-bit RAR grant and the number of bits used by the above fields, the number of bits left for fixed size resource block assignment is not more than 10. Assuming a ~20-byte MSG3, 6 RBs are needed for MCS=0 and slot based PUSCH transmission with 1+1+1 DMRS configuration. Table 1 shows the maximum number of RBs that can be allocated with NR resource allocation type 1 under some example BWP sizes with start position and length of 1-RB granularity. Considering (1) BWP size in NR can be much larger than the maximum LTE bandwidth and (2) non-slot based MSG3 transmission (2, 4, 7 symbols) is supported, the start RB position and length should support x-RB granularity, where x>=1. The concrete proposed granularity values are given in Table 2. Like LTE RAR grant, If frequency hopping is not enabled, all the bits assigned to the field of fixed size resource block assignment can be used to indicate the start RB position and length.

If frequency hopping is enabled, some MSB bits assigned to the field of fixed size resource block assignment are used for frequency hopping indication and the remaining LSB bits are used to indicate the start RB position and length. The number of MSB bits used for frequency hopping indication depends on how general PUSCH frequency hopping is designed and the frequency hopping configuration needs to be signaled in system information and/or RRC.

The use of NR resource allocation type 0—bitmap of RBGs—is less suitable for RAR grant. This is because MSG3 is small payload of usually less than 20 bytes. For large BWP, the RBG size may be 8 or 16, which would be too large for MSG3. With limited number (<=10) of bits for fixed size resource block assignment, we have to limit RAR grant within a subset of large BWP and smaller RBG size is used for RAR grant. This may require a new set of special rules of handling RAR grant, including (1) which subset of BWP is used and (2) the RBG size (which may further depend on time domain assignment with 2, 4, 7 OSs or slot-based transmission). The rules may be fixed in the spec (e.g., the bitmap in RAR grant is considered as the MSB or LSB or central bits in the full bitmap for the whole BWP), and/or signaled in system information and/or RRC configured. Due to these complications, we prefer to use NR resource allocation type 1 for RAR grant.

TABLE 1

Maximum number of RBs that can be allocated with NR resource allocation type 1 with start position and length of 1-RB granularity

| # of RBs in a BWP: N_RB | N_RB = 44 | N_RB = 94 | N_RB = 188 | N_RB = 275 |
| --- | --- | --- | --- | --- |
| 10 bits w/o hopping | 44 RBs | 12 RBs | 6 RBs | 4 RBs |
| 10 bits w/2 bits excluded for hopping | 7 RBs | 3 RBs | 2 RBs | 1 RB |

TABLE 2

Proposed granularity of start position and length for fixed size resource block assignment in RAR grant

| # of RBs in a BWP: N_RB | N_RB <= 94 | 94 < N_RB <= 188 | 188 < N_RB |
|---|---|---|---|
| Slot based | 1 RB | 2 RB | 4 RB |
| 7 symbols | 2 RB | 4 RB | 8 RB |
| 4 symbols | 4 RB | 8 RB | 16 RB |
| 2 symbols | 8 RB | 16 RB | 32 RB |

Proposal 1 The 20-bit RAR grant in NR has contents from MSB to LSB as
  Hopping flag—1 bit
  Fixed size time domain assignment—2 bits
    Indicate an entry in a truncated time domain assignment table of 4 rows that is configured by RMSI and optionally reconfigured by RRC
  Fixed size resource block assignment—9 bits
    Indicating the start RB position and length. The start RB position and length should support x-RB granularity, where x depends on BWP size, slot vs. non-slot (2, 4, 7 OSs) transmission
    If frequency hopping is not enabled, all the bits can be used to indicate the start RB position and length.
    If frequency hopping is enabled, some MSB bits are used for frequency hopping indication and the remaining LSB bits are used to indicate the start RB position and length.
  TPC command for scheduled PUSCH—3 bits
    Indicate a value in the range from −6 dB to 8 dB with a 2 dB step size
  Truncated modulation and coding scheme—4 bits
    Indicate an entry of the first 16 rows of a MCS table without 256QAM that depends on the configured OFDM or DFT-S-OFDM for the uplink transmission
  CSI request—1 bit
    Indicate if an aperiodic CSI report is included in the PUSCH transmission in contention free random access, and is reserved for contention based random access.

2.2 PDCCH Ordered Random Access

In the LS [2] sent by RAN2 to RAN1, it says that

RAN2 NR protocol design relies on that random access procedure can be initiated by the network with a "PDCCH order"; e.g., for synchronizing the UL prior to DL data transmission to allow transmission of e.g., HARQ feedback when UL time alignment may have been lost."

RAN2 appreciates that physical layer procedure aspects for PDCCH order have been specified in TS 38.213, but corresponding DCI (see DCI format 1A in LTE) and associated timing appears to be work still in progress in RAN1. RAN2 would like to inform RAN1 that RAN2 assumes that PDCCH order to initiate random access will be available for the first NR drop.

Furthermore, RAN2 assumes that the PDCCH order should contain the following fields:
  Random Access Preamble index—Indicating which Random access preamble to use in case of contention free random access procedure, or the value 000000 in case of contention-based random access procedure
  BWP index—Indicating which BWP to transmit the Random access preamble on
  SUL indicator—Indicating whether to transmit the Random access preamble on SUL or normal uplink carrier RAN2 requests RAN1 to verify and timely complete possible remaining aspects of PDCCH order for initiation of random access, taking the above assumptions into account. In this section, we present our views on PDCCH ordered random access for NR.
  DCI format
    It is natural to use a DCI format that has the same size as the compact DCIs (i.e., format 0_0 and 1_0) for PDCCH ordered random access to reduce UE blind decoding complexity while keeping the signaling overhead low. Since DCI size is what really matters, we can either use format 0_0 or 1_0 by redefining/reinterpreting the existing fields or define a new format of the same size as formats 0_0 and 1_0.
  DCI content
    Random Access Preamble index—6 bits
      Per RAN2 LS, this field is used to indicate which random access preamble to use
    SSB index—2, 3, or 8 bits depending on SSB configuration
      By ordering the UE to transmit random access preamble in RACH occasion associated with a SSB index, gNB can receive the preamble in the indicated RACH occasion directly without the need of blindly receiving the preamble in all possible RACH occasion associated with different SSB indices. This reduces PRACH false alarm rate and increases PRACH detection rate.
      NOTE: If SSB-per-rach-occasion is greater than 1, the random access preambles in a RACH occasion are mapped to different SSBs. Network should make sure the 6-bit random access preamble index and SSB index are not conflicting. UE is not expected to receive conflicting indication of 6-bit random access preamble index and SSB index.
    BWP index—may not be necessary, or 0, 1 or 2 bits depending on the configuration
      This field may not be necessary. In TS 38.321, there are rules for performing random access: if PRACH resources are configured for the active UL BWP, UE performs the random access procedure on the active DL BWP and UL BWP. Otherwise, UE switches to initial DL BWP and UL BWP and performs the random access procedure on the initial DL BWP and UL BWP.
      If including BWP index is found to be useful, it may use 0, 1 or 2 bits depending on the configuration
    SUL indicator—0 or 1 bit depending on configuration
      If SUL is not configured, we don't need this field. Otherwise, 1 bit is used to indicate normal UL or SUL for the random access
    All the other fields are fixed to be either 0 or 1 in a way such that DCI ordering random access can be distinguished from formats 0_0 and 1_0 used for other purposes
Proposal 2 For PDCCH ordered random access, reinterpret some of the existing fields in format 1_0 or 0_0 and set the other fields as follows
  Random Access Preamble index—6 bits
  SSB index—2, 3, or 8 bits depending on SSB configuration
  BWP index—may not be necessary, or if found useful, 0, 1 or 2 bits depending on the configuration
  SUL indicator—0 or 1 bit depending on configuration
  All the other fields are fixed to be either 0 or 1 in a way such that DCI ordering random access can be distinguished from format 1_0 or 0_0 used for other purposes

3. CONCLUSIONS

In this contribution, we discuss the remaining DCI issues needed to stabilize the basic and essential NR functionalities within the scope of the drop approved during RAN #78.

4. REFERENCES

[1] TS 36.213
[2] R1-1801073, LS on PDCCH order for initiation of random access, RAN2, Ericsson
[3] TS 38.321

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BL | Bandwidth limited |
| BWP | Bandwidth part |
| CE | Coverage enhancement |
| CRM | Contention resolution message |
| CSI | Channel state information |
| DCI | Downlink control information |
| DFT | Discrete Fourier transform |
| DL | Downlink |
| DMRS | Demodulation reference signal |
| eNB | enhanced Node B |
| gNB | Next generation Node B |
| LSB | Least significant bit |
| LTE | Long-Term Evolution |
| MCS | Modulation coding scheme |
| MSB | Most significant bit |
| MSG2 | Message 2 |
| MSG3 | Message 3 |
| NB-IoT | Narrowband Internet of Things |
| NR | New radio |
| OFDM | Orthogonal frequency division multiplexing |
| OSI | Other system information |
| PDCCH | Physical Downlink Control Channel |
| PRACH | Physical Random Access Channel |
| PSS | Primary synchronization signal |
| PUSCH | Physical Uplink Shared Channel |
| QAM | Quadrature amplitude modulation |
| RA | Random access |
| RAR | Random access response |
| RB | Resource block |
| RBG | Resource block group |
| RMSI | Remaining system information |
| RNTI | Radio Network Temporary Identifier |
| RRC | Radio resource control |
| SCH | Shared channel |
| SS | Synchronization signal |
| SSS | Secondary synchronization signal |
| TDD | Time division duplex |

| Abbreviation | Explanation |
| --- | --- |
| TPC | Transmit power control |
| TRP | Transmission and Reception Point |
| UE | User equipment |
| UL | Uplink |
| WD | Wireless Device |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising processing circuitry configured to:
   determine a fixed size resource block, RB, assignment for an uplink transmission by the wireless device, the uplink transmission corresponding to a message 3, MSG3, transmission of a New Radio, NR, random access procedure and being scheduled by a random access response, RAR, corresponding to a message 2, MSG2, transmission of the NR random access procedure in which the fixed size RB assignment is indicated to the wireless device;
   the fixed size RB assignment being based at least in part on at least one of:
      whether the uplink transmission is one of a slot transmission having a time duration of a slot and a non-slot transmission having a time duration less than a slot; and
      resource allocation type used in the RAR; and
   indicate the fixed sized RB assignment to the wireless device.

2. The network node of claim 1, wherein the fixed size RB assignment indicates a RB granularity, the RB granularity being based at least in part on one of a bandwidth part size and transmission duration.

3. The network node of claim 2, wherein the RB granularity indicates a RB start position and quantity of RBs for the uplink transmission.

4. The network node of claim 1, wherein the fixed size RB assignment is further based at least in part on whether the uplink transmission is one of a slot transmission having a time duration of a slot and non-slot transmission having a time duration less than a slot.

5. The network node of claim 1, wherein the fixed size RB assignment assigns RBs corresponding to one of:
   lowest RB values of a group of RBs;
   highest RB values of the group of RBs; and
   middle RB values of the group of RBs.

6. The network node of claim 1, wherein the uplink transmission corresponds to a message 3, MSG3, transmission.

7. A wireless device configured to communicate with a network node, the wireless device comprising processing circuitry configured to:
   cause transmission of an uplink transmission, the uplink transmission corresponding to a message 3, MSG3, transmission of a New Radio, NR, random access procedure, the uplink transmission being based at least in part on a fixed size resource block, RB, assignment indicated in a random access response, RAR, corresponding to a message 2, MSG2, transmission of the NR random access procedure for scheduling of the uplink transmission, the fixed size RB assignment being based at least in part on at least one of:
      whether the uplink transmission is one of a slot transmission having a time duration of a slot and a non-slot transmission having a time duration less than a slot; and
      resource allocation type used in the RAR.

8. The wireless device of claim 7, wherein the fixed size RB assignment indicates a RB granularity, the RB granularity being based at least in part on one of a bandwidth part size and transmission duration.

9. The wireless device of claim 8, wherein the RB granularity indicates a RB start position and quantity of RBs for the uplink transmission.

10. The wireless device of claim 7, wherein the fixed size RB assignment is based at least in part on the uplink transmission is one of slot transmission having a time duration of a slot and non-slot transmission having a time duration less than a slot.

11. The wireless device of claim 7, wherein the fixed size RB assignment assigns RBs corresponding to one of:
   lowest RB values of a group of RBs;
   highest RB values of the group of RBs; and
   middle RB values of the group of RBs.

12. The wireless device of claim 7, wherein the uplink transmission corresponds to a message 3, MSG3, transmission.

13. The wireless device of claim 7, wherein the fixed sized RB assignment is indicated in a message 2, MSG2, transmission.

14. A method performed by a network node configured to communicate with a wireless device, the method comprising:
   determining a fixed size resource block, RB, assignment for an uplink transmission by the wireless device, the uplink transmission corresponding to a message 3, MSG3, transmission of a New Radio, NR, random access procedure and being scheduled by a random access response, RAR. corresponding to a message 2, MSG2, transmission of the NR random access procedure in which the fixed size RB assignment is indicated to the wireless device;
   the fixed size RB assignment being based at least in part on at least one of:
      whether the uplink transmission is one of a slot transmission having a time duration of a slot and a non-slot transmission having a time duration less than a slot; and
      resource allocation type used in the RAR; and
   indicating the fixed sized RB assignment to the wireless device.

15. The method of claim 14, wherein the fixed size RB assignment indicates a RB granularity, the RB granularity being based at least in part on one of a bandwidth part size and transmission duration.

16. The method of claim 15, wherein the RB granularity indicates a RB start position and quantity of RBs for the uplink transmission.

17. The method of claim 14, wherein the fixed sized RB assignment is further based at least in part on whether the uplink transmission is one of slot transmission having a time duration of a slot and non-slot transmission having a time duration less than a slot.

18. The method of claim 14, wherein the fixed size RB assignment assigns RBs corresponding to one of:
   lowest RB values of a group of RBs;
   highest RB values of the group of RBs; and
   middle RB values of the group of RBs.

19. The method of claim 14, wherein the uplink transmission corresponds to a message 3, MSG3, transmission.

20. The method of claim 14, wherein the fixed sized RB assignment is indicated in a message 2, MSG2, transmission.

* * * * *

UNITED STATES PATENT AND TRADEMARK OFFICE
CERTIFICATE OF CORRECTION

PATENT NO. : 11,792,788 B2  
APPLICATION NO. : 17/689373  
DATED : October 17, 2023  
INVENTOR(S) : Lin et al.

Page 1 of 2

It is certified that error appears in the above-identified patent and that said Letters Patent is hereby corrected as shown below:

In the Specification

In Column 1, Line 9, delete "2020," and insert -- 2020, now U.S. Pat. No. 11,284,420, --, therefor.

In Column 2, Line 62, delete "index" and insert -- indicator --, therefor.

In Column 2, Line 62, delete "preceding" and insert -- precoding --, therefor.

In Column 2, Line 63, delete "indication" and insert -- indicator --, therefor.

In Column 2, Line 66, delete "narrow band" and insert -- narrowband --, therefor.

In Column 8, Line 7, delete "user equipment (WD)" and insert -- user equipment (UE) --, therefor.

In Column 8, Lines 13-14, delete "communication (M2M)," and insert -- (M2M) communication, --, therefor.

In Column 8, Line 16, delete "equipped" and insert -- equipment --, therefor.

In Column 8, Line 19, delete "(NB-IOT)" and insert -- (NB-IoT) --, therefor.

In Column 8, Line 24, delete "network" and insert -- radio network --, therefor.

In Column 9, Line 49, delete "Wide Band" and insert -- Wideband --, therefor.

In Column 10, Lines 59-60, delete "NB s, eNB s," and insert -- NBs, eNBs, --, therefor.

In Column 11, Line 17, delete "WS" and insert -- WD --, therefor.

In Column 12, Line 54, delete "and or" and insert -- and/or --, therefor.

Signed and Sealed this  
Twenty-second Day of October, 2024

Katherine Kelly Vidal  
*Director of the United States Patent and Trademark Office*

In Column 20, Line 62, delete "RSMI" and insert -- RMSI --, therefor.

In Column 23, Line 41, delete "Example Cl." and insert -- Example C1. --, therefor.

In Column 25, Line 51, delete "$N_{NB}^{UL} \leq 44$" and insert -- $N_{RB}^{UL} \leq 44$ --, therefor.

In the Claims

In Column 32, Line 43, in Claim 14, delete "RAR." and insert -- RAR, --, therefor.